(12) United States Patent
Kim et al.

(10) Patent No.: US 12,271,231 B2
(45) Date of Patent: Apr. 8, 2025

(54) FOLDABLE DISPLAY DEVICE AND METHOD OF MANUFACTURING THE SAME

(71) Applicant: Samsung Display Co., LTD., Yongin-si (KR)

(72) Inventors: Min Ji Kim, Seoul (KR); Yong Hyuck Lee, Cheonan-si (KR); Hyun Jun Cho, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/695,956

(22) Filed: Mar. 16, 2022

(65) Prior Publication Data

US 2023/0017674 A1    Jan. 19, 2023

(30) Foreign Application Priority Data

Jul. 8, 2021 (KR) .................. 10-2021-0089445

(51) Int. Cl.
G06F 1/16 (2006.01)
(52) U.S. Cl.
CPC .......... *G06F 1/1652* (2013.01); *G06F 1/1641* (2013.01)
(58) Field of Classification Search
CPC ....... G06F 1/1652; G06F 1/1641; G09F 9/301
See application file for complete search history.

(56) References Cited

U.S. PATENT DOCUMENTS

| | | | |
|---|---|---|---|
| 9,639,121 B2* | 5/2017 | Min | ...................... H05K 1/038 |
| 9,681,567 B2 | 6/2017 | Min | |
| 10,056,443 B2* | 8/2018 | Shyu | ...................... H10K 59/40 |
| 10,516,119 B2* | 12/2019 | Lee | ..................... H10K 50/8445 |
| 10,976,873 B2 | 4/2021 | Shin et al. | |
| 11,442,202 B2 | 9/2022 | Park et al. | |
| 11,449,179 B2 | 9/2022 | Shin et al. | |

(Continued)

FOREIGN PATENT DOCUMENTS

| | | |
|---|---|---|
| KR | 1020150004679 | 1/2015 |
| KR | 1020160002541 | 1/2016 |

(Continued)

OTHER PUBLICATIONS

International Search Report—PCT/KR2022/009450 dated Nov. 18, 2022.
Written Opinion—PCT/KR2022/009450 dated Nov. 18, 2022.

*Primary Examiner* — James Wu
(74) *Attorney, Agent, or Firm* — CANTOR COLBURN LLP

(57) ABSTRACT

A foldable display device includes a display panel which includes a folding area, a first non-folding area disposed adjacent to a first side of the folding area, and a second non-folding area disposed adjacent to a second side of the folding area opposite to the first side of the folding area, and a panel support member which is disposed on a surface of the display panel and in which a plurality of slits extending in a first direction is defined. The panel support member includes a first layer which has a first fiber yarn extending in a second direction intersecting the first direction, a second layer which has a second fiber yarn extending in the first direction, and a third layer which has a third fiber yarn extending in the second direction.

6 Claims, 28 Drawing Sheets

(56) References Cited

U.S. PATENT DOCUMENTS

| | | | |
|---|---|---|---|
| 2008/0213474 A1* | 9/2008 | Saida | H10K 50/844 427/162 |
| 2020/0168675 A1 | 5/2020 | Kim et al. | |
| 2020/0301474 A1 | 9/2020 | Yug | |
| 2022/0201874 A1 | 6/2022 | You et al. | |
| 2022/0223074 A1 | 7/2022 | Park et al. | |
| 2022/0231239 A1 | 7/2022 | Ryu et al. | |

FOREIGN PATENT DOCUMENTS

| KR | 101737155 | 5/2017 |
|---|---|---|
| KR | 1020200084495 | 7/2020 |
| KR | 1020210019803 | 2/2021 |
| KR | 1020210056484 | 5/2021 |
| KR | 1020220091665 | 7/2022 |
| KR | 1020220105690 | 7/2022 |

* cited by examiner

SLT: SLT1, SLT2, SLT3, SLT4, SLT5, SLT6, SLT7, SLT8, SLT9, SLT10, SLT11
BAR: HBAR1, HBAR2, HBAR3, HBAR4, HBAR5, HBAR6, HBAR7, HBAR8,
 HBAR9, HBAR10, HBAR11, VBAR1, VBAR2, VBAR3, VBAR4, VBAR5,
 VBAR6, VBAR7, VBAR8, VBAR9, VBAR10

SLT: SLT1, SLT2, SLT3, SLT4, SLT5, SLT6, SLT7, SLT8, SLT9, SLT10, SLT11
BAR: HBAR1, HBAR2, HBAR3, HBAR4, HBAR5, HBAR6, HBAR7, HBAR8,
    HBAR9, HBAR10, HBAR11, VBAR1, VBAR2, VBAR3, VBAR4, VBAR5,
    VBAR6, VBAR7, VBAR8, VBAR9, VBAR10

FOLDABLE DISPLAY DEVICE AND METHOD OF MANUFACTURING THE SAME

This application claims priority to Korean Patent Application No. 10-2020-0089445, filed on Jul. 8, 2021, and all the benefits accruing therefrom under 35 U.S.C. § 119, the content of which in its entirety is herein incorporated by reference.

BACKGROUND

1. Field

Embodiments of the invention relate to a foldable display device and a method of manufacturing the same.

2. Description of the Related Art

As an information society develops, demands for display devices for displaying images are increasing in various forms. The display devices are being applied to various electronic devices such as smartphones, digital cameras, notebook computers, navigation devices, and smart televisions, for example.

In order to increase portability of the display device while providing a wide display screen, a bendable display device in which a display area may be bent or a foldable display device in which a display area may be folded have been released recently.

In addition, the display device supports a touch input using a user's body part (e.g., a finger) and a touch input using an electronic pen (e.g., a stylus pen). Since the display device uses the touch input using the electronic pen, the display device may sense a touch input more precisely than when only using the touch input using the user's body part.

SUMMARY

When a metal support member is used to support a display panel of a foldable display device, sensitivity of a touch input using an electronic pen may be reduced due to the metal support member.

Embodiments of the invention provide a foldable display device including a panel support member which may support a display panel while not reducing the sensitivity of a touch input using an electronic instrument (e.g., electronic pen).

Embodiments of the invention provide a method of manufacturing a foldable display device including a panel support member which may support a display panel while not reducing the sensitivity of a touch input using an electronic pen.

An embodiment of the invention provides a foldable display device including a display panel which includes a folding area, a first non-folding area disposed adjacent to a first side of the folding area, and a second non-folding area disposed adjacent to a second side of the folding area opposite to the first side of the folding area, and a panel support member which is disposed on a surface of the display panel and in which a plurality of slits extending in a first direction is defined. The panel support member includes a first layer which has a first fiber yarn extending in a second direction intersecting the first direction, a second layer which has a second fiber yarn extending in the first direction, and a third layer which has a third fiber yarn extending in the second direction.

In an embodiment, a thickness of the second layer may be greater than a thickness of the first layer and a thickness of the third layer.

In an embodiment, the first direction may be parallel to a first folding line corresponding to a first boundary between the folding area and the first non-folding area and a second folding line corresponding to a second boundary between the folding area and the second non-folding area.

In an embodiment, the plurality of slits may be defined in the folding area.

In an embodiment, the plurality of slits may include first slits defined in a first column, second slits defined in a second column and third slits defined in a third column, and the second slits are shifted in the first direction compared with the first slits and the third slits.

In an embodiment, a lower half of any one of the first slits, an upper half of any one of the second slits, and a lower half of any one of the third slits may overlap each other in the second direction.

An embodiment of the invention provides a foldable display device including a display panel which includes an alignment mark, and a panel support member which is disposed on a surface of the display panel and in which a notch extending in a thickness direction of the display panel is defined. The panel support member includes a first layer which has a first fiber yarn extending in a second direction intersecting a first direction, a second layer which has a second fiber yarn extending in the first direction, and a third layer which has a third fiber yarn extending in the second direction. The alignment mark may overlap the notch in the thickness direction of the display panel.

In an embodiment, the notch may have a shape of a groove or a ditch recessed from a side surface of the panel support member.

In an embodiment, the foldable display device may further include an optical device which senses light. The display panel may include a light transmitting area which overlaps the optical device in the thickness direction of the display panel, and the panel support member may include a through hole which overlaps the light transmitting area in the thickness direction of the display panel.

In an embodiment, the area of the light transmitting area may be larger than the area of the through hole.

An embodiment of the invention provides a method of manufacturing a foldable display device including forming edges of a panel support member by intense light, forming a lattice pattern in a folding area of the panel support member by the intense light, attaching a digitizer member onto a surface of the panel support member, and attaching the panel support member onto a surface of a display panel.

In an embodiment, a pulse period of the intense light may be several to hundreds of nanoseconds, several to hundreds of picoseconds, or several to hundreds of femtoseconds.

In an embodiment, when the intense light is an ultraviolet laser and the pulse period of the intense light is several to hundreds of nanoseconds, a scan speed of the intense light may be about 800 millimeters per second (mm/s) or less, a pulse repetition rate of the intense light may be about 200 kilohertz (kHz) or less, and power of the intense light may be about 13 watts (W) or less.

In an embodiment, when the intense light is an ultraviolet laser and the pulse period of the intense light may be several to hundreds of picoseconds or several to hundreds of femtoseconds, the scan speed of the intense light may be 5000 mm/s or less, the pulse repetition rate of the intense light may be 3000 kHz or less, and the power of the intense light may be 50 W or less.

In an embodiment, when the intense light is an infrared laser and the pulse period of the intense light is several to hundreds of picoseconds or several to hundreds of femtoseconds, the scan speed of the intense light may be 1000 mm/s or less, the pulse repetition rate of the intense light may be 2000 kHz or less, and the power of the intense light may be 20 W or less.

In an embodiment, the method may further include defining a through hole passing through the panel support member by the intense light.

In an embodiment, in the forming the edges the panel support member by the intense light, at least one notch may be defined in a side surface of the panel support member.

In an embodiment, a plurality of slits may be defined by a plurality of bars and extend in a first direction in the lattice pattern.

In an embodiment, the plurality of slits includes a first slit, a second slit, and a third slit defined in a second direction intersecting the first direction, and the forming the lattice pattern in the folding area of the panel support member by the intense light may include defining the first slit, skipping the second slit, and defining the third slit.

In an embodiment, the slits may include a plurality of first slits defined in the first direction, and the forming the lattice pattern in the folding area of the panel support member by the intense light may include defining a first slit of the first slits, skipping a first slit neighboring a defined first slit in the first direction, and defining a first slit neighboring a skipped first slit in the first direction.

BRIEF DESCRIPTION OF THE DRAWINGS

These and/or other features of the invention will become apparent and more readily appreciated from the following description of the embodiments, taken in conjunction with the accompanying drawings, in which.

DETAILED DESCRIPTION

Figure 1A:
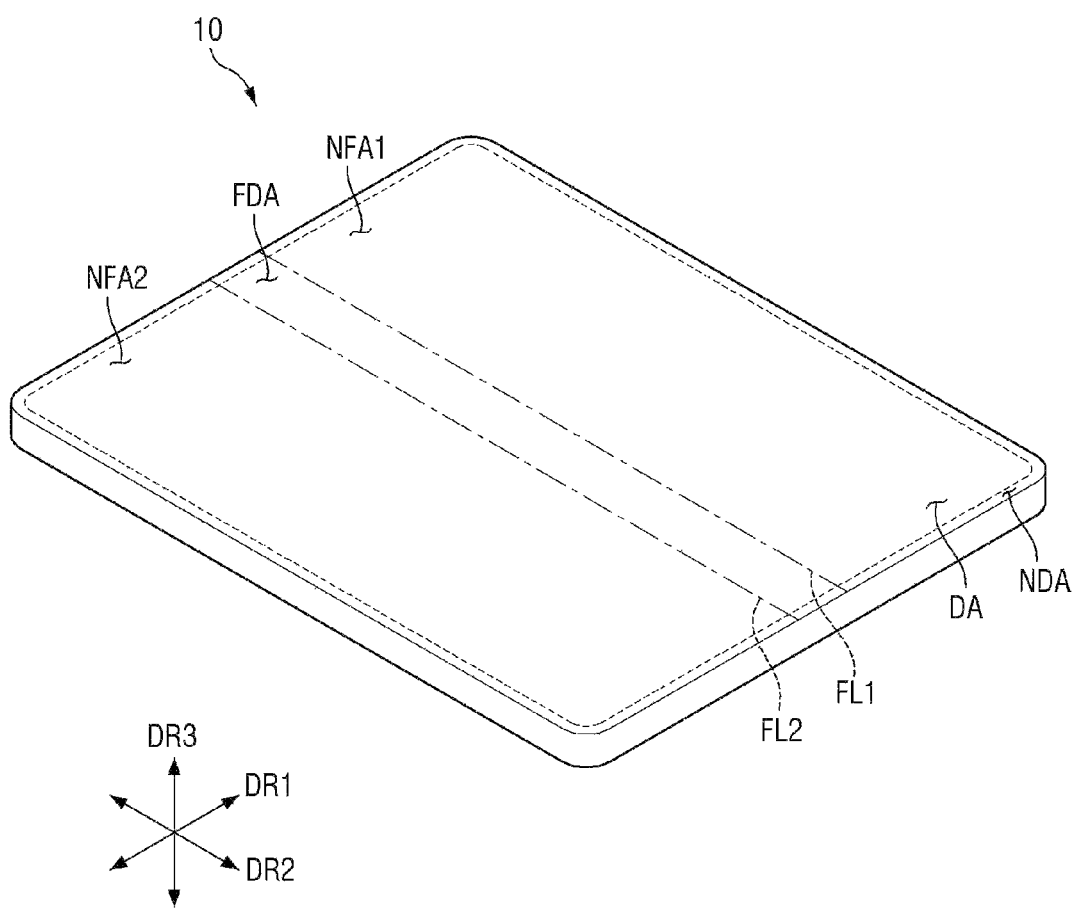
FIGS. 1A and 1B are perspective views of an embodiment of a display device.

Embodiments of the invention will now be described more fully hereinafter with reference to the accompanying drawings, in which preferred embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. The same reference numbers indicate the same components throughout the specification. In the attached drawing figures, the thickness of layers and regions is exaggerated for clarity.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

It will also be understood that when a layer is referred to as being "on" another layer or substrate, it can be directly on the other layer or substrate, or intervening layers may also be present. In contrast, when an element is referred to as being "directly on" another element, there are no intervening elements present.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." "At least one of A and B" means "A and/or B." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system).

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. A region illustrated or described as flat may, typically, have rough and/or nonlinear features, for example. Moreover, sharp angles that are illustrated may be rounded. Thus, the regions illustrated in the drawing figures are schematic in nature and their shapes are not intended to illustrate the precise shape of a region and are not intended to limit the scope of the claims.

Hereinafter, embodiments of the invention will be described in detail with reference to the accompanying drawings.

Figure 1B:
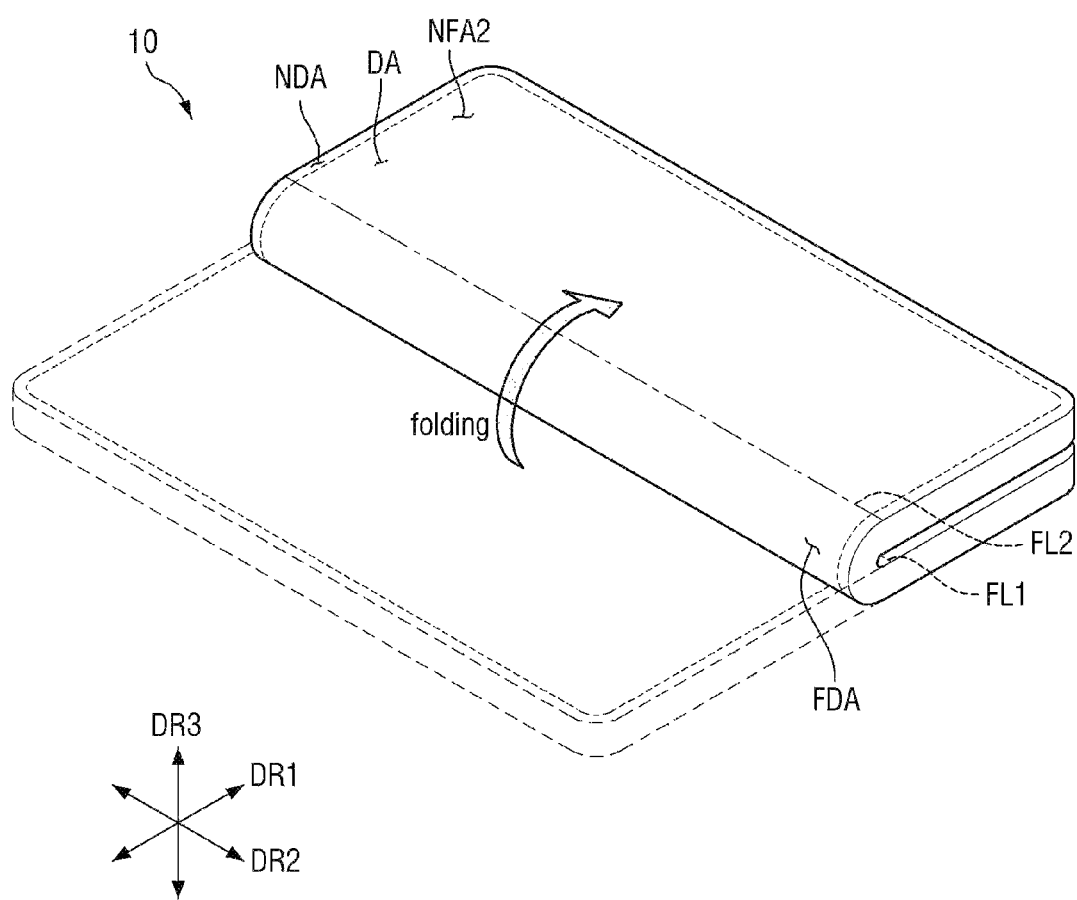

FIGS. 1A and 1B are perspective views of an embodiment of a foldable display device 10.

FIG. 1A illustrates a first state in which the foldable display device 10 is not folded at folding lines FL1 and FL2, and FIG. 1B illustrates a second state in which the foldable display device 10 is folded at the folding lines FL1 and FL2.

Referring to FIGS. 1A and 1B, the foldable display device 10 in the embodiment is a device for displaying moving images or still images. The foldable display device 10 may be used as a display screen in portable electronic devices such as mobile phones, smartphones, tablet personal computers ("PCs"), smart watches, watch phones, mobile communication terminals, electronic notebooks, electronic books, portable multimedia players ("PMPs"), navigation devices and ultra-mobile PCs ("UMPCs"), as well as in various products such as televisions notebook computers, monitors, billboards and the internet of things ("IoT").

In FIGS. 1A and 1B, a first direction DR1 may be a direction parallel to a side of the display device 10 in a plan view, and may be a horizontal direction of the display device 10, for example. A second direction DR2 may be a direction parallel to another side in contact with the side of the display device 10 in a plan view, and may be a vertical direction of the display device 10, for example. A third direction DR3 may be a thickness direction of the display device 10.

The planar shape of the display device 10 may be a quadrangular shape such as a rectangular shape. Each corner of the display device 10 may have a right-angled planar shape or a round planar shape. A front surface of the display device 10 may include two short sides extending in the first direction DR1 and two long sides extending in the second direction DR2.

The display device 10 includes a display area DA and a non-display area NDA. The planar shape of the display area DA may follow the shape of the display device 10. In an embodiment, when the display device 10 is quadrangular (e.g., rectangular) in a plan view, the display area DA may also be quadrangular (e.g., rectangular) in a plan view, for example. However, the invention is not limited thereto, and the planar shape of the display area DA may not follow the shape of the display device 10.

The display area DA may be an area which includes a plurality of pixels to display an image. The non-display area NDA may be an area which does not include pixels and thus does not display an image. The non-display area NDA may be disposed around the display area DA. The non-display area NDA may surround the display area DA, but the invention is not limited thereto. The display area DA may be partially surrounded by the non-display area NDA.

The display device 10 may maintain both the first state which is an unfolded state and the second state which is a folded state. The display device 10 may be folded in an in-folding manner so that parts of the display area DA face each other as illustrated in FIG. 1B. In this case, parts of the front surface of the display device 10 may face each other when the display device 10 is folded. In an alternative embodiment, the display device 10 may be folded in an out-folding manner so that parts of a rear surface of the display device 10 face each other.

The display device 10 may include a folding area FDA, a first non-folding area NFA1, and a second non-folding area NFA2. The folding area FDA may be an area in which the display device 10 is bent or folded. The first non-folding area NFA1 and the second non-folding area NFA2 may be areas in which the display device 10 is not bent or folded. That is, the first non-folding area NFA1 and the second non-folding area NFA2 may be flat areas of the display device 10.

The first non-folding area NFA1 may be disposed on a side, e.g., a right side of the folding area FDA. The second non-folding area NFA2 may be disposed on an opposite side, e.g., a left side of the folding area FDA. The folding area FDA may be an area which is defined by a first folding line FL1 and a second folding line FL2 and an area in which the display device 10 is bent with a predetermined curvature. The first folding line FL1 may be a boundary between the folding area FDA and the first non-folding area NFA1, and the second folding line FL2 may be a boundary between the folding area FDA and the second non-folding area NFA2.

The first folding line FL1 and the second folding line FL2 may extend in the second direction DR2 as illustrated in FIGS. 1A and 1B, and in this case, the display device 10 may be folded in the first direction DR1. Therefore, since a length of the display device 10 in the first direction DR1 may be reduced by about half, it may be easy for a user to carry the display device 10.

When the first folding line FL1 and the second folding line FL2 extend in the second direction DR2 as illustrated in FIGS. 1A and 1B, a length of the folding area FDA in the second direction DR2 may be greater than a length of the folding area FDA in the first direction DR1. In addition, a length of the first non-folding area NFA1 in the second direction DR2 may be greater than a length of the first non-folding area NFA1 in the first direction DR1. A length of the second non-folding area NFA2 in the second direction DR2 may be greater than a length of the second non-folding area NFA2 in the first direction DR1.

Each of the display area DA and the non-display area NDA may overlap at least one of the folding area FDA, the first non-folding area NFA1, and the second non-folding area NFA2. In FIGS. 1A and 1B, each of the display area DA and the non-display area NDA overlaps the folding area FDA, the first non-folding area NFA1, and the second non-folding area NFA2.

Figure 2A:
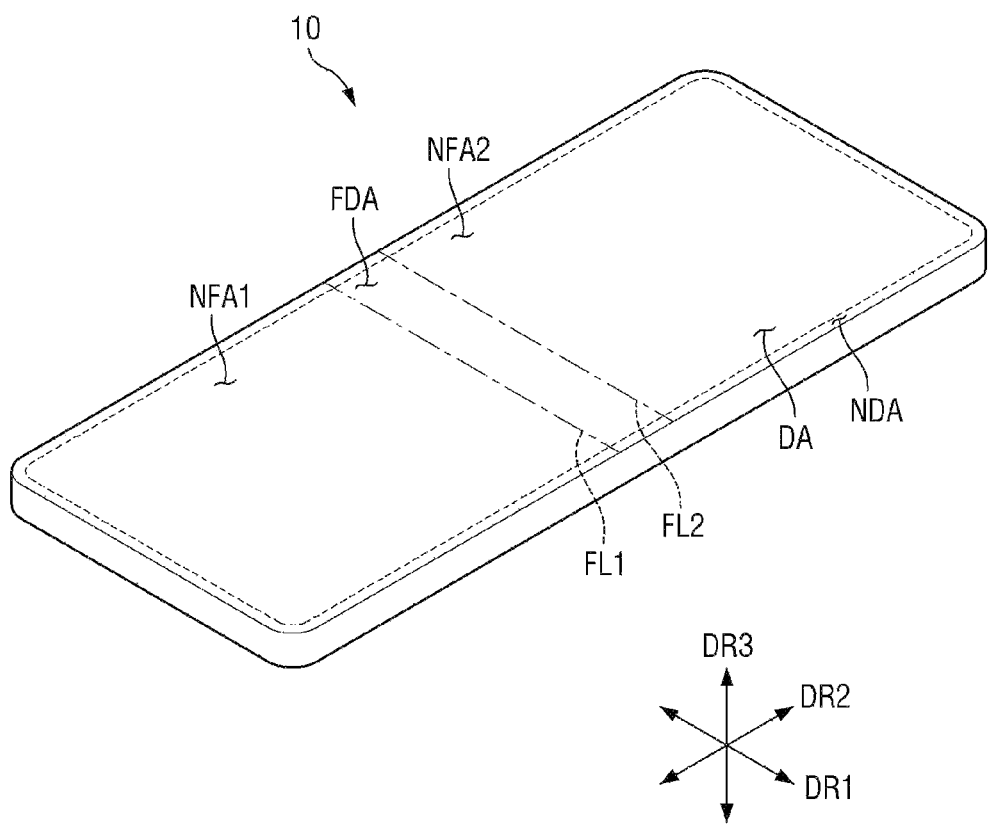
FIGS. 2A and 2B are perspective views of an embodiment of a display device.
Figure 2B:
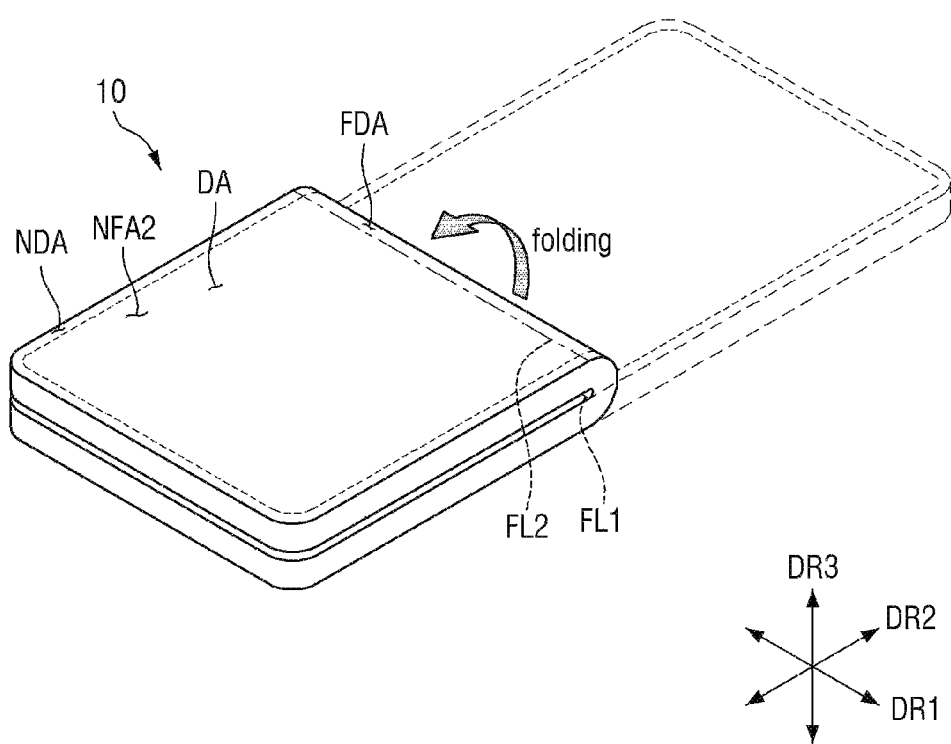

FIGS. 2A and 2B are perspective views of an embodiment of a display device 10. FIG. 2A is a perspective view of an embodiment of the display device 10 in an unfolded state. FIG. 2B is a perspective view of an embodiment of the display device 10 in a folded state.

The embodiment of FIGS. 2A and 2B is only different from the embodiment of FIGS. 1A and 1B in that a first folding line FL1 and a second folding line FL2 extend in the first direction DR1 and the display device 10 is folded in the second direction DR2 and thus that a length of the display device 10 in the second direction DR2 is reduced by about half. Therefore, in FIGS. 2A and 2B, a description of elements and features identical to those of the embodiment of FIGS. 1A and 1B will be omitted.

Referring to FIGS. 2A and 2B, a first non-folding area NFA1 may be disposed on a side, e.g., a lower side of a folding area FDA. A second non-folding area NFA2 may be disposed on an opposite side, e.g., an upper side of the folding area FDA. When the first folding line FL1 and the second folding line FL2 extend in the first direction DR1 as illustrated in FIGS. 2A and 2B, a length of the folding area FDA in the first direction DR1 may be greater than a length of the folding area FDA in the second direction DR2.

Figure 3:
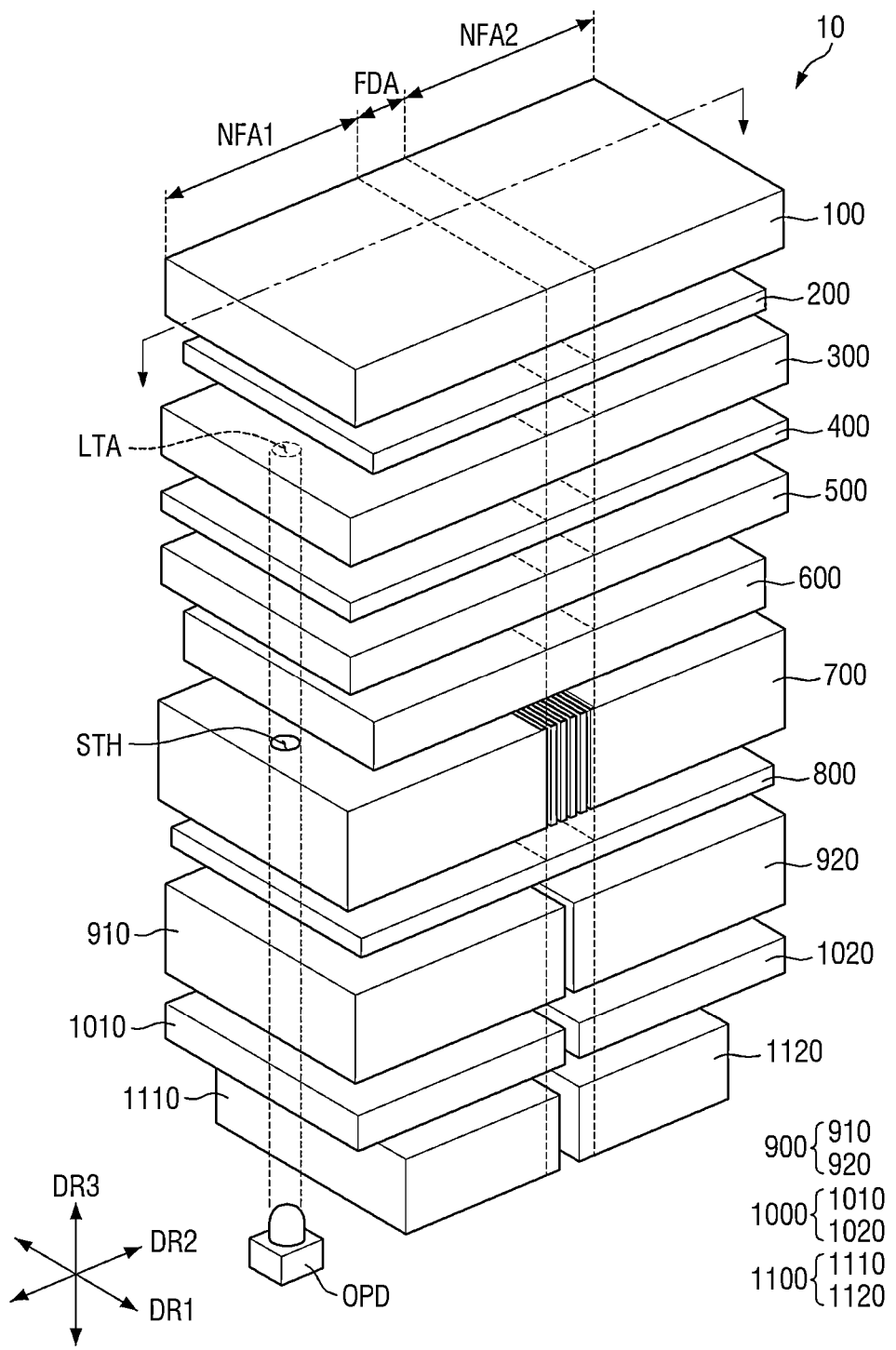
FIG. 3 is an exploded perspective view of an embodiment of a display device.
Figure 4:
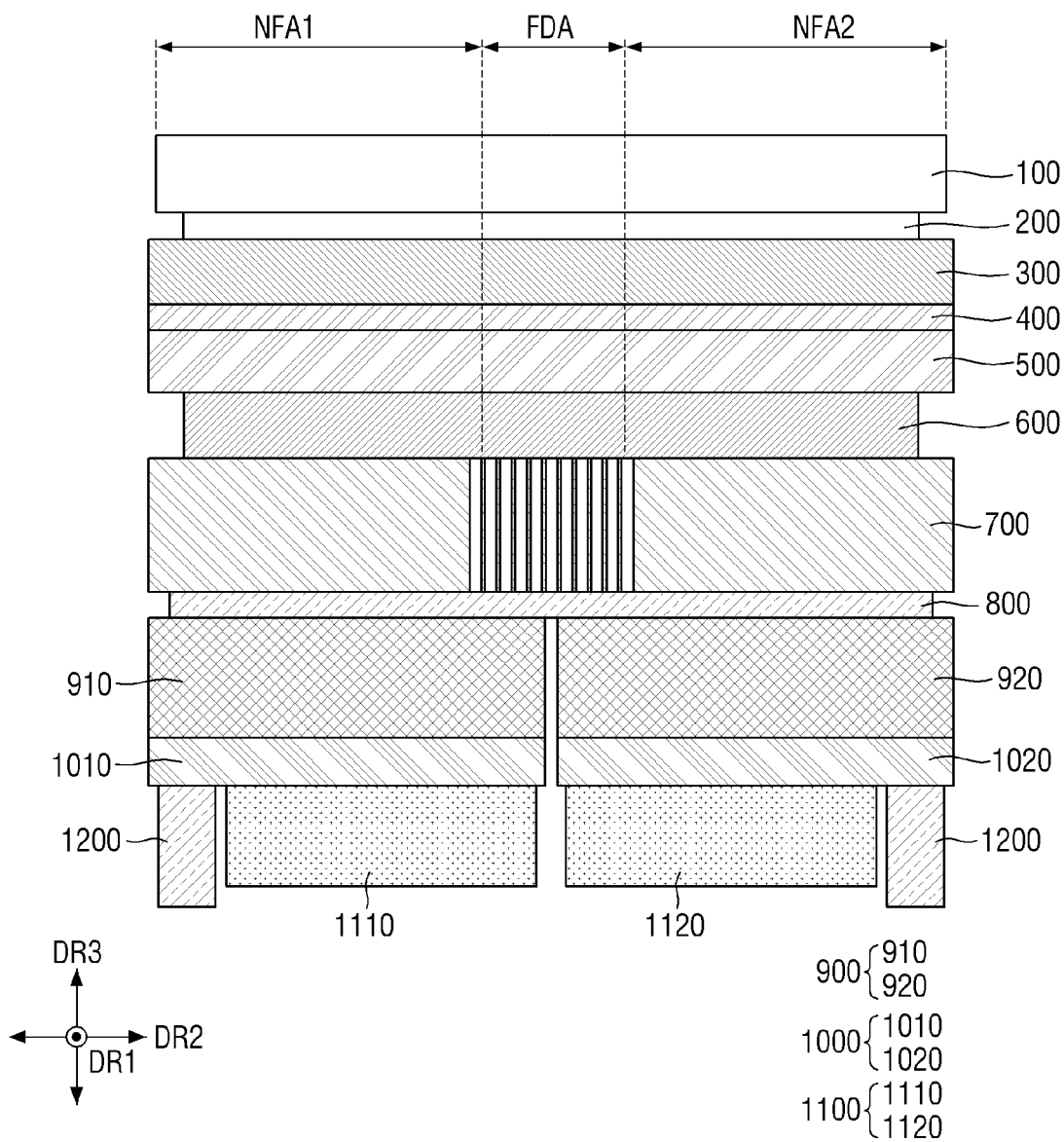
FIG. 4 is a side view of an embodiment of the display device.

FIG. 3 is an exploded perspective view of an embodiment of a display device 10. FIG. 4 is a side view of an embodiment of the display device 10.

Referring to FIGS. 3 and 4, the display device 10 in the embodiment may include an upper protection member 100, a window member 200, a first adhesive member 300, a display panel 400, a panel protection member 500, an under-panel member 600, a panel support member 700, a second adhesive member 800, a digitizer member 900, a metal support member 1000, a buffer member 1100, and a third adhesive member 1200.

The display panel 400 may be a panel that displays an image. The display panel 400 may be an organic light-emitting display panel including an organic light-emitting layer, a quantum dot light-emitting display panel including a quantum dot light-emitting layer, an inorganic light-emitting display panel using an inorganic semiconductor element as a light-emitting element, or a micro light-emitting display panel using a micro light-emitting diode as a light-emitting element. A case where the display panel 400 is an organic light-emitting display panel will be mainly described below, but the invention is not limited thereto.

The display panel 400 may include a light transmitting area LTA overlapping an optical device OPD in the third direction DR3. The optical device OPD may be an optical sensor that senses light, for example, a camera sensor, a proximity sensor, or an illuminance sensor. The light transmitting area LTA may be a part of a display area DA.

The light transmitting area LTA may include a transmitting area that may transmit light. In an alternative embodiment, the light transmitting area LTA may be a through hole that passes through the display panel 400. The light transmittance of the light transmitting area LTA may be higher than the light transmittance of the display area DA excluding the light transmitting area LTA. In addition, due to the transmitting area of the light transmitting area LTA, the density or integration degree of pixels in the light transmitting area LTA may be lower than the density or integration degree of pixels in the display area DA excluding the light transmitting area LTA. In an embodiment, the number of pixels per unit area in the light transmitting area LTA may be smaller than the number of pixels per unit area in the display area DA excluding the light transmitting area LTA. In an alternative embodiment, pixels per inch ("PPI") in the light transmitting area LTA may be smaller than PPI in the display area DA excluding the light transmitting area LTA, for example.

The window member 200 may be attached onto a front surface of the display panel 400 by the first adhesive member 300. The window member 200 may include a transparent material, for example, may be glass or plastic. In an embodiment, the window member 200 may be ultra-thin glass ("UTG") having a thickness of about 0.1 mm or less or may be a transparent polyimide film, for example. The first adhesive member 300 may be a transparent adhesive film or a transparent adhesive resin.

The upper protection member 100 may be disposed on a front surface of the window member 200. The upper protection member 100 may be attached to the front surface of the window member 200. The upper protection member 100 may perform at least one of scattering prevention, shock absorption, dent prevention, fingerprint prevention, and anti-glare functions of the window member 200.

A light-blocking pattern may be formed or provided on a rear surface of the upper protection member 100. The light-blocking pattern may be disposed on or adjacent to edges of the upper protection member 100. The light-blocking pattern may include a light-blocking material that may block light. In an embodiment, the light-blocking pattern may be an inorganic black pigment such as carbon black, an organic block pigment, or an opaque metal material, for example.

The panel protection member 500 may be disposed on a rear surface of the display panel 400. The panel protection member 500 may support the display panel 400 and protect the rear surface of the display panel 400. The panel protection member 500 may be plastic such as polyethylene terephthalate (PET) or polyimide. Although the panel protection member 500 is disposed in a folding area FDA of the display device 10 in FIGS. 3 and 4, the invention is not limited thereto. In an embodiment, the panel protection member 500 may be removed from the folding area FDA of the display device 10 so that the display device 10 may be smoothly folded, for example.

The under-panel member 600 may be disposed on a rear surface of the panel protection member 500. The under-panel member 600 may include at least one of a light-blocking layer for absorbing light incident from the outside, a buffer layer for absorbing external shock, and a heat dissipating layer for efficiently dissipating the heat of the display panel 400.

The light-blocking layer blocks transmission of light to prevent elements disposed under the light-blocking layer, for example, the digitizer member 900 from being seen from above the display panel 400. The light-blocking layer may include a light absorbing material such as a black pigment or a black dye.

The buffer layer absorbs external shock to prevent the display panel 400 from being damaged. The buffer layer may consist of a single layer or a plurality of layers. In an embodiment, the buffer layer may include or consist of polymer resin such as polyurethane, polycarbonate, polypropylene or polyethylene or may include or consist of an elastic material such as rubber, a urethane-based material, or a sponge formed by foam molding an acrylic-based material.

The heat dissipating layer may include a first heat dissipating layer including graphite or carbon nanotubes and a second heat dissipating layer including or consisting of a metal thin film (such as copper, nickel, ferrite or silver) capable of shielding electromagnetic waves and having excellent heat conductivity.

The panel support member 700 may be disposed on a rear surface of the under-panel member 600. The panel support member 700 may be a rigid member that is not easily changed in shape or volume by external pressure. In an embodiment, the panel support member 700 may be a polymer including carbon fibers or glass fibers, for example. The panel support member 700 may include a lattice pattern disposed in the folding area FDA so that it may be easily bent in the folding area FDA.

A through hole STE overlapping the optical device OPD in the third direction DR3 may be defined in the panel support member 700. The through hole STH may overlap the light transmitting area LTA of the display panel 400 in the third direction DR3. The area of the through hole STH may be larger than the area of the light transmitting area LTA. The optical device OPD may sense light incident from a front surface of the display device 10 through the light transmitting area LTA and the through hole STH.

The panel support member 700 will be described in detail with reference to FIGS. 6 through 11.

The digitizer member 900 may include a first digitizer member 910 and a second digitizer member 920. The first digitizer member 910 and the second digitizer member 920 may be disposed on a rear surface of the panel support member 700. The first digitizer member 910 and the second digitizer member 920 may be attached to the rear surface of the panel support member 700 by the second adhesive member 800. The second adhesive member 800 may be a pressure sensitive adhesive.

The first digitizer member 910 and the second digitizer member 920 may not be disposed in the folding area. FDA to reduce folding stress of the display device 10. The first digitizer member 910 may be disposed in a first non-folding area NFA1, and the second digitizer member 920 may be disposed in a second non-folding area NFA2. A gap between the first digitizer member 910 and the second digitizer member 920 may overlap the folding area FDA, and a width of the gap may be smaller than a width of the folding area FDA. The width of the folding area FDA may be a length of the folding area FDA in the second direction DR2.

In an embodiment, the first digitizer member 910 and the second digitizer member 920 may include electrode patterns for sensing approach or contact of an electronic instrument (e.g., electronic pen) such as a stylus pen that supports electromagnetic resonance ("EMR"). The first digitizer member 910 and the second digitizer member 920 may sense a magnetic field or electromagnetic signal emitted from the electronic pen based on the electrode patterns and determine a point, at which the sensed magnetic field or electromagnetic signal is the greatest, as touch coordinates.

Magnetic metal power may be disposed on a rear surface of the first digitizer member 910 and a rear surface of the second digitizer member 920. In this case, a magnetic field or an electromagnetic signal passing through the first digitizer member 910 and the second digitizer member 920 may flow into the magnetic metal powder. Therefore, due to the magnetic metal powder, it is possible to reduce the emission of the magnetic field or electromagnetic signal of the first digitizer member 910 and the second digitizer member 920 from a rear surface of the display device 10.

The metal support member 1000 may include a first metal support member 1010 and a second metal support member 1020. The first metal support member 1010 may be disposed on the rear surface of the first digitizer member 910, and the second metal support member 1020 may be disposed on the rear surface of the second digitizer member 920.

The first metal support member 1010 and the second metal support member 1020 may not be disposed in the folding area FDA to reduce folding stress of the display device 10. The first metal support member 1010 may be disposed in the first non-folding area NFA1, and the second metal support member 1020 may be disposed in the second non-folding area NFA2. A gap between the first metal support member 1010 and the second metal support member 1020 may overlap the folding area FDA, and a width of the gap may be smaller than the width of the folding area FDA.

The first metal support member 1010 and the second metal support member 1020 may include a material having high rigidity to support the first digitizer member 910 and the second digitizer member 920. In an embodiment, the first metal support member 1010 and the second metal support member 1020 may include stainless steel such as SUS316, for example.

The buffer member 1100 may include a first buffer member 1110 and a second buffer member 1120. The first buffer member 1110 and the second buffer member 1120 may absorb external shock to prevent the panel support member 700 and the digitizer member 900 from being damaged. In an embodiment, the first buffer member 1110 and the second buffer member 1120 may include an elastic material such as rubber, a urethane-based material, or a sponge formed or provided by foam molding an acrylic-based material.

The first buffer member 1110 may be disposed on a rear surface of the first metal support member 1010, and the second buffer member 1120 may be disposed on a rear surface of the second metal support member 1020. The first buffer member 1110 and the second buffer member 1120 may not be disposed in the folding area FDA to reduce folding stress of the display device 10. The first buffer member 1110 may be disposed in the first non-folding area NFA1, and the second buffer member 1120 may be disposed in the second non-folding area NFA2. A gap between the first buffer member 1110 and the second buffer member 1120 may overlap the folding area FDA, and a width of the gap may be smaller than the width of the folding area FDA.

The third adhesive member 1200 may be disposed on the rear surface of the first metal support member 1010 and the rear surface of the second metal support member 1020. The third adhesive member 1200 may be disposed on edges of the first metal support member 1010 and edges of the second metal support member 1020. The third adhesive member 1200 may surround the first buffer member 1110 and the second buffer member 1120. The third adhesive member 1200 may be a waterproof tape or a waterproof member for attaching the rear surface of the metal support member 1000 to a front surface of a frame disposed on a rear surface of the buffer member 1100. Therefore, the third adhesive member 1200 may prevent moisture or dust from penetrating into the display device 10. That is, a waterproof and dustproof display device 10 may be provided.

In an alternative embodiment, the third adhesive member 1200 may not surround the first buffer member 1110 and the second buffer member 1120 and may overlap, in the third direction DR3, a magnet for keeping the display device 10 folded. In this case, the third adhesive member 1200 may serve as a magnetic shielding member which may shield magnetism to prevent the digitizer member 900 or the display panel 400 from being affected by the magnetism of the magnet.

As illustrated in FIGS. 3 and 4, the panel support member 700 may be disposed on the rear surface of the display panel 400 and may support the display panel 400 because it is a rigid member that is not easily changed in shape or volume by external pressure. In addition, since the panel support member 700 includes or consists of a polymer including carbon fibers or glass fibers, a magnetic field or electromagnetic signal of the digitizer member 900 may pass through the panel support member 700. Therefore, the panel support member 700 capable of supporting the display panel 400 while not reducing the touch sensitivity of the digitizer member 900 may be provided.

In addition, since the panel support member 700 includes a lattice pattern disposed in the folding area FDA, it may be easily bent when the display device 10 is folded.

Figure 5:
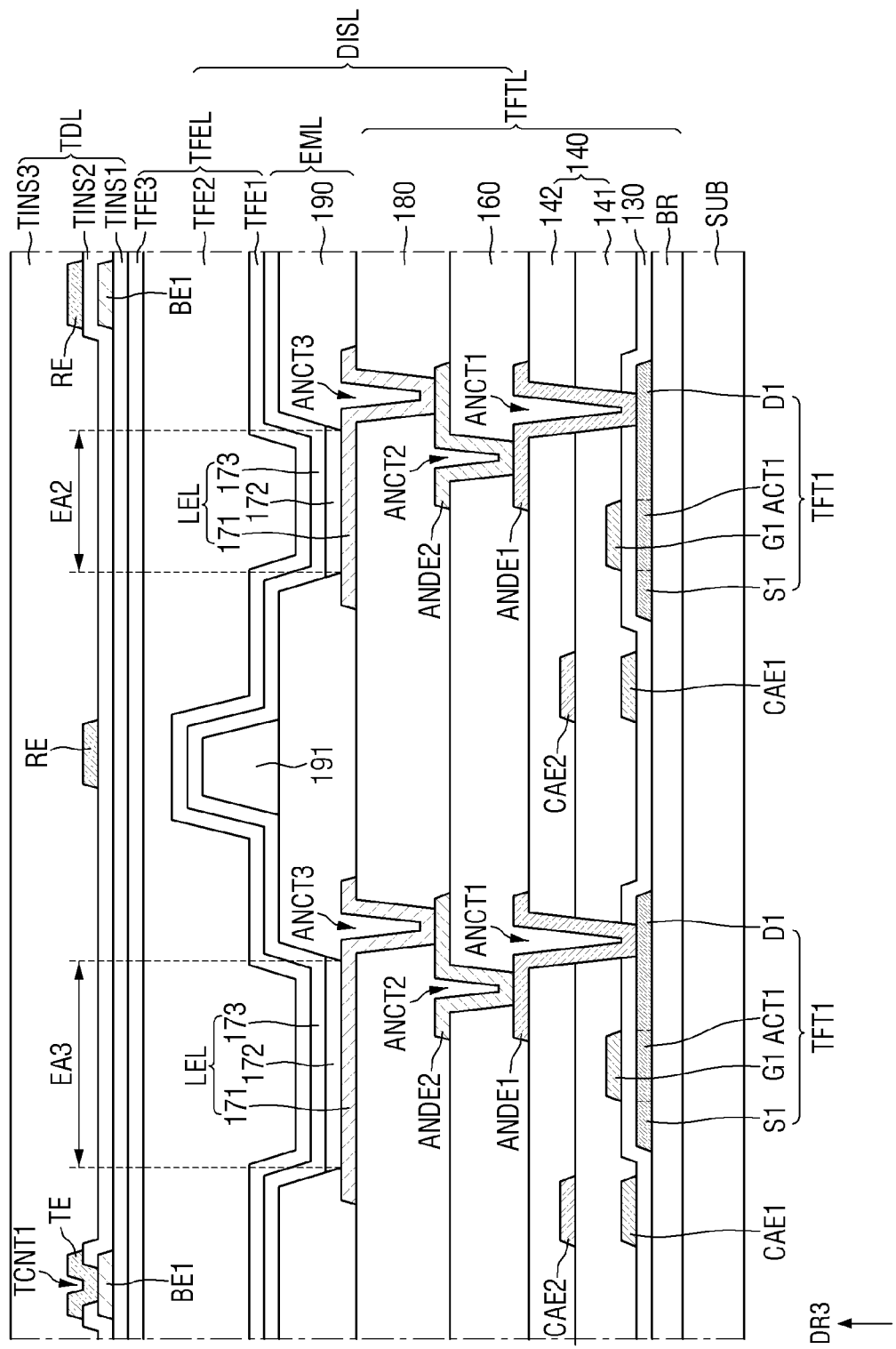
FIG. 5 is a detailed cross-sectional view of an embodiment of a display panel of FIGS. 3 and 4.

FIG. 5 is a detailed cross-sectional view of an embodiment of the display panel 400 of FIGS. 3 and 4.

Referring to FIG. 5, a display layer DISL may be disposed on a substrate SUB. The display layer DISL may include a thin-film transistor layer TFTL, a light-emitting element layer EML, and an encapsulation layer TFEL.

The thin-film transistor layer TFTL may be disposed on the substrate SUB. The thin-film transistor layer TFTL may include a barrier layer BR, thin-film transistors TFT1, first capacitor electrodes CAE1, second capacitor electrodes CAE2, first anode connection electrodes ANDE1, second anode connection electrodes ANDE2, a gate insulating layer 130, a first interlayer insulating film 141, a second interlayer insulating film 142, a first planarization layer 160, and a second planarization layer 180.

The substrate SUB may include an insulating material such as polymer resin. In an embodiment, the substrate SUB may include or consist of polyimide, for example. The substrate SUB may be a flexible substrate that may be deformable, e.g., bendable, foldable, rollable, or the like.

The barrier layer BR may be disposed on the substrate SUB. The barrier layer BR is a layer for protecting transistors of the thin-film transistor layer TFTL and light-emitting layers 172 of the light-emitting element layer EML from moisture introduced through the substrate SUB which is vulnerable to moisture penetration. The barrier layer BR may consist of a plurality of inorganic layers stacked alternately. In an embodiment, the barrier layer BR may be a multilayer in which one or more inorganic layers including or consisting of a silicon nitride layer, a silicon oxynitride layer, a silicon oxide layer, a titanium oxide layer, and an aluminum oxide layer are alternately stacked, for example.

The thin-film transistors TFT1 may be disposed on the barrier layer BR. An active layer ACT1 of each of the thin-film transistors TFT1 may be disposed on the barrier layer BR. The active layer ACT1 of each of the thin-film transistors TFT1 may include polycrystalline silicon, monocrystalline silicon, low-temperature polycrystalline silicon, amorphous silicon, or an oxide semiconductor.

The active layer ACT1 may include a channel region CHA1, a source region S1, and a drain region D1. The channel region CHA1 may be a region overlapped by a gate electrode G1 in the third direction DR3 which is the thickness direction of the substrate SUB. The source region S1 may be disposed on a side of the channel region CHA1, and the drain region D1 may be disposed on an opposite side of the channel region CHA1. The source region S1 and the drain region D1 may be regions non-overlapped by the gate electrode G1 in the third direction DR3. The source region S1 and the drain region D1 may be regions formed or provided to have conductivity by doping a silicon semiconductor or an oxide semiconductor with ions or impurities.

The gate insulating layer 130 may be disposed on the active layers ACT1 of the thin-film transistors TFT1. In an embodiment, the gate insulating layer 130 may include or consist of an inorganic layer such as a silicon nitride layer, a silicon oxynitride layer, a silicon oxide layer, a titanium oxide layer, or an aluminum oxide layer.

The gate electrodes G1 of the thin-film transistors 'TFT' and the first capacitor electrodes CAE1 may be disposed on the gate insulating layer 130. The gate electrodes G1 may overlap the active layers ACT1 in the third direction DR3. Although the gate electrodes G1 and the first capacitor electrodes CAE1 are spaced apart from each other in FIG. 5, they may also be connected to each other and unitary with each other. In an embodiment, each of the gate electrodes G1 and the first capacitor electrodes CAE1 may be a single layer or a multilayer including or consisting of any one or more of molybdenum (Mo), aluminum (Al), chromium (Cr), gold (Au), titanium (Ti), nickel (Ni), neodymium (Nd), copper (Cu), and alloys of the same.

The first interlayer insulating film 141 may be disposed on the gate electrodes G1 of the thin-film transistors TFT1 and the first capacitor electrodes CAE1. In an embodiment, the first interlayer insulating film 141 may include or consist of an inorganic layer such as a silicon nitride layer, a silicon oxynitride layer, a silicon oxide layer, a titanium oxide layer, or an aluminum oxide layer. The first interlayer insulating film 141 may consist of a plurality of inorganic layers.

The second capacitor electrodes CAE2 may be disposed on the first interlayer insulating film 141. The second capacitor electrodes CAE2 may overlap the first capacitor electrodes CAE1 in the third direction DR3. In addition, when the gate electrodes G1 and the first capacitor electrodes CAE1 are unitary with each other, the second capacitor electrodes CAE2 may overlap the gate electrodes G1 in the third direction DR3. Since the first interlayer insulating film 141 has a predetermined dielectric constant, the first capacitor electrodes CAE1, the second capacitor electrodes CAE2, and the first interlayer insulating film 141 disposed therebetween may form capacitors. In an embodiment, each of the second capacitor electrodes CAE2 may be a single layer or a multilayer including or consisting of any one or more of molybdenum (Mo), aluminum (Al), chromium (Cr), gold (Au), titanium (Ti), nickel (Ni), neodymium (Nd), copper (Cu), and alloys of the same.

The second interlayer insulating film 142 may be disposed on the second capacitor electrodes CAE2. In an embodiment, the second interlayer insulating film 142 may include or consist of an inorganic layer such as a silicon nitride layer, a silicon oxynitride layer, a silicon oxide layer, a titanium oxide layer, or an aluminum oxide layer. The second interlayer insulating film 142 may consist of a plurality of inorganic layers.

The first anode connection electrodes ANDE1 may be disposed on the second interlayer insulating film 142. A first anode connection electrode ANDE1 may be connected to the drain region D1 of each of the thin-film transistors TFT1 through a first connection contact hole ANCT1 penetrating the gate insulating layer 130, the first interlayer insulating film 141 and the second interlayer insulating film 142. In an embodiment, each of the first anode connection electrodes ANDE1 may be a single layer or a multilayer including or consisting of any one or more of molybdenum (Mo), aluminum (Al), chromium (Cr), gold (Au), titanium (Ti), nickel (Ni), neodymium (Nd), copper (Cu), and alloys of the same.

The first planarization layer 160 may be disposed on the first anode connection electrodes ANDE1 to planarize steps due to the thin-film transistors TFT1. In an embodiment, the first planarization layer 160 may include or consist of an organic layer such as acryl resin, epoxy resin, phenolic resin, polyamide resin, or polyimide resin.

The second anode connection electrodes ANDE2 may be disposed on the first planarization layer 160. Each of the second anode connection electrodes ANDE2 may be connected to a first anode connection electrode ANDE1 through a second connection contact hole ANCT2 penetrating the first planarization layer 160. In an embodiment, each of the second anode connection electrodes ANDE2 may be a single layer or a multilayer including or consisting of any one or more of molybdenum (Mo), aluminum (Al), chromium (Cr), gold (Au), titanium (Ti), nickel (Ni), neodymium (Nd), copper (Cu), and alloys of the same.

The second planarization layer 180 may be disposed on the second anode connection electrodes ANDE2. In an embodiment, the second planarization layer 180 may include or consist of an organic layer such as acryl resin, epoxy resin, phenolic resin, polyamide resin, or polyimide resin.

The light-emitting element layer EML including light-emitting elements LEL and a bank 190 may be disposed on the second planarization layer 180. Each of the light-emitting elements LEL includes a pixel electrode 171, the light-emitting layer 172, and a common electrode 173.

The pixel electrode 171 may be disposed on the second planarization layer 180. The pixel electrode 171 may be connected to each of the second anode connection electrodes ANDE2 through a third connection contact hole ANCT3 penetrating the second planarization layer 180.

In an embodiment, in a top emission structure in which light is emitted from the light-emitting layer 172 toward the common electrode 173, the pixel electrode 171 may include a metal material having high reflectivity, such as a stacked structure (Ti/Al/Ti) of aluminum and titanium, a stacked structure (ITO/Al/ITO) of aluminum and indium tin oxide ("ITO"), a stacked structure (ITO/Ag/ITO) of silver and ITO, an APC alloy, or a stacked structure (ITO/APC/ITO) of an APC alloy and ITO. The APC alloy is an alloy of silver (Ag), palladium (Pd), and copper (Cu).

The bank 190 may be formed or disposed on the second planarization layer 180 to separate the pixel electrodes 171 so as to define a first emission part (not shown), a second emission part EA2, a third emission part EA3, and a fourth emission part (not shown). The bank 190 may cover edges of the pixel electrodes 171. The bank 190 may include or consist of an organic layer such as acryl resin, epoxy resin, phenolic resin, polyamide resin, or polyimide resin.

Each of the first emission part (not shown), the second emission part EA2, the third emission part EA3, and the fourth emission part (not shown) is an area in which the pixel electrode 171, the light-emitting layer 172, and the common electrode 173 are sequentially stacked so that holes from the pixel electrode 171 and electrons from the common electrode 173 recombine together in the light-emitting layer 172 to emit light.

The light-emitting layer 172 may be disposed on the pixel electrode 171 and the bank 190. The light-emitting layer 172 may include an organic material to emit light of a predetermined color. In an embodiment, the light-emitting layer 172 includes a hole transporting layer, an organic material layer, and an electron transporting layer, for example.

The common electrode 173 may be disposed on the light-emitting layer 172. The common electrode 173 may cover the light-emitting layer 172. The common electrode 173 may be a common layer formed or provided commonly to the first emission part (not shown), the second emission part EA2, the third emission part EA3, and the fourth emission part (not shown). A capping layer CPL may be formed or disposed on the common electrode 173.

In an embodiment, in the top emission structure, the common electrode 173 may include a transparent conductive material ("TCO") capable of transmitting light, such as ITO or indium zinc oxide ("IZO"), or a semi-transmissive conductive material such as magnesium (Mg), silver (Ag) or an alloy of Mg and Ag. When the common electrode 173 includes a semi-transmissive conductive material, light output efficiency may be increased by a microcavity.

A spacer 191 may be disposed on the bank 190. The spacer 191 may support a mask during a process of manufacturing the light-emitting layers 172. In an embodiment, the spacer 191 may include or consist of an organic layer such as acryl resin, epoxy resin, phenolic resin, polyamide resin, or polyimide resin.

The encapsulation layer TFEL may be disposed on the common electrodes 173. The encapsulation layer TFEL includes at least one inorganic layer to prevent oxygen or moisture from permeating into the light-emitting element layer EML. In addition, the encapsulation layer TFEL includes at least one organic layer to protect the light-emitting element layer EML from foreign substances such as dust. In an embodiment, the encapsulation layer TFEL includes a first encapsulating inorganic layer TFE1, an encapsulating organic layer TFE2, and a second encapsulating inorganic layer TFE3, for example.

The first encapsulating inorganic layer TFE1 may be disposed on the common electrodes 173, the encapsulating organic layer TFE2 may be disposed on the first encapsulating inorganic layer TFE1, and the second encapsulating inorganic layer TFE3 may be disposed on the encapsulating organic layer TFE2. In an embodiment, each of the first encapsulating inorganic layer TFE1 and the second encapsulating inorganic layer TFE3 may be a multilayer in which one or more inorganic layers including or consisting of a silicon nitride layer, a silicon oxynitride layer, a silicon oxide layer, a titanium oxide layer, and an aluminum oxide layer are alternately stacked. The encapsulating organic layer TFE2 may be an organic layer such as acryl resin, epoxy resin, phenolic resin, polyamide resin, or polyimide resin.

A touch sensing layer TDL may be disposed on the encapsulation layer TFEL. The touch sensing layer TDL includes a first touch insulating layer TINS1, connection electrodes BE1, a second touch insulating layer TINS2, driving electrodes TE, sensing electrodes RE, and a third touch insulating layer TINS3.

The first touch insulating layer TINS1 may be disposed on the encapsulation layer TFEL. In an embodiment, the first touch insulating layer TINS1 may include or consist of an inorganic layer such as a silicon nitride layer, a silicon oxynitride layer, a silicon oxide layer, a titanium oxide layer, or an aluminum oxide layer.

The connection electrodes BE1 may be disposed on the first touch insulating layer TINS1. In an embodiment, each of the connection electrodes BE1 may be a single layer or a multilayer including or consisting of any one or more of molybdenum (Mo), aluminum (Al), chromium (Cr), gold (Au), titanium (Ti), nickel (Ni), neodymium (Nd), copper (Cu), and alloys of the same.

The second touch insulating layer TINS2 is disposed on the connection electrodes BE1. In an embodiment, the second touch insulating layer TINS2 may include or consist of an inorganic layer such as a silicon nitride layer, a silicon oxynitride layer, a silicon oxide layer, a titanium oxide layer, or an aluminum oxide layer. In an alternative embodiment, the second touch insulating layer TINS2 may include or consist of an organic layer such as acryl resin, epoxy resin, phenolic resin, polyamide resin, or polyimide resin.

The driving electrodes TE and the sensing electrodes RE may be disposed on the second touch insulating layer TINS2. In addition to the driving electrodes TE and the sensing electrodes RE, other components such as dummy patterns, touch driving wires, or touch sensing wires may be disposed on the second touch insulating layer TINS2. In an embodiment, each of the driving electrodes TE and the sensing electrodes RE may be a single layer or a multilayer including any one or more of molybdenum (Mo), aluminum (Al), chromium (Cr), gold (Au), titanium (Ti), nickel (Ni), neodymium (Nd), copper (Cu), and alloys of the same.

The driving electrodes TE and the sensing electrodes RE may overlap the connection electrodes BE1 in the third direction DR3. Each of the driving electrodes TE may be connected to a connection electrode BE1 through a touch contact hole TCNT1 penetrating the second touch insulating layer TINS2.

The third touch insulating layer TINS3 is formed or disposed on the driving electrodes TE and the sensing electrodes RE. The third touch insulating layer TINS3 may planarize steps formed or provided by the driving electrodes TE, the sensing electrodes RE, and the connection electrodes BE1. In an embodiment, the third touch insulating layer TINS3 may include or consist of an organic layer such as acryl resin, epoxy resin, phenolic resin, polyamide resin, or polyimide resin.

Figure 6:
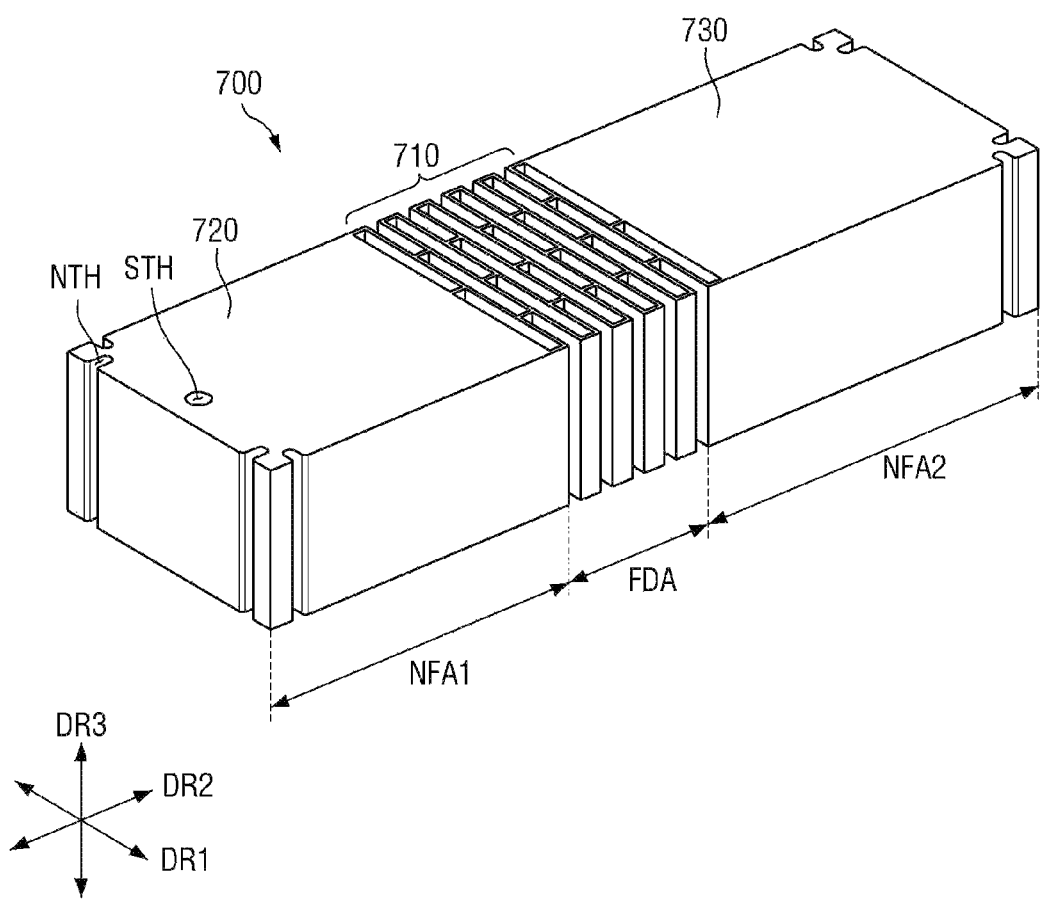
FIG. 6 is a perspective view of an embodiment of a panel support member of FIGS. 3 and 4.
Figure 7:
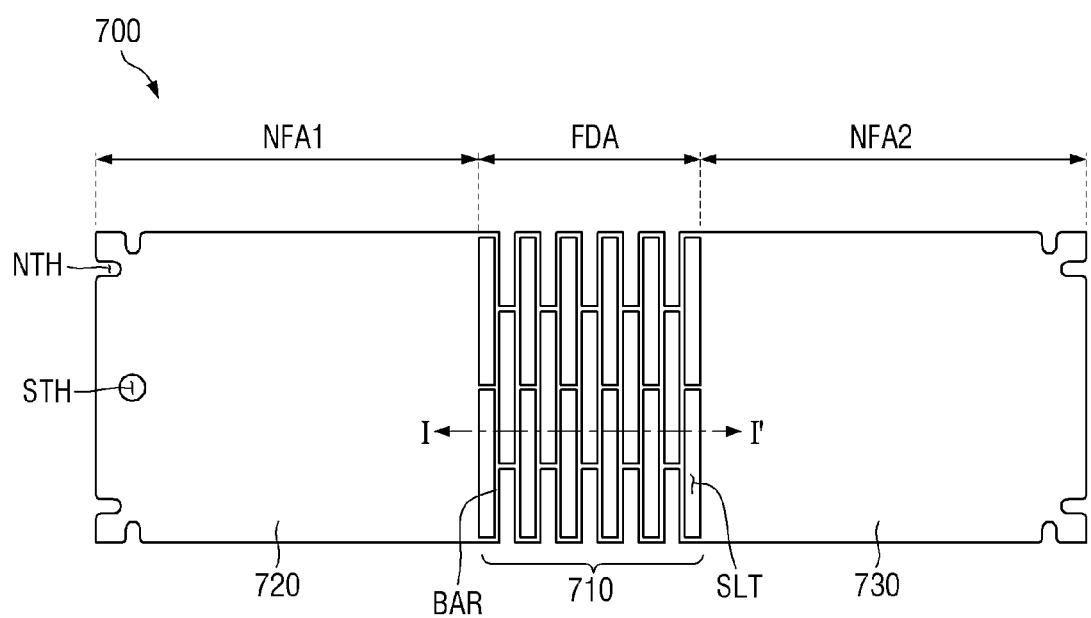
FIG. 7 is a ply view of an embodiment of the panel support member of FIGS. 3 and 4.
Figure 8:
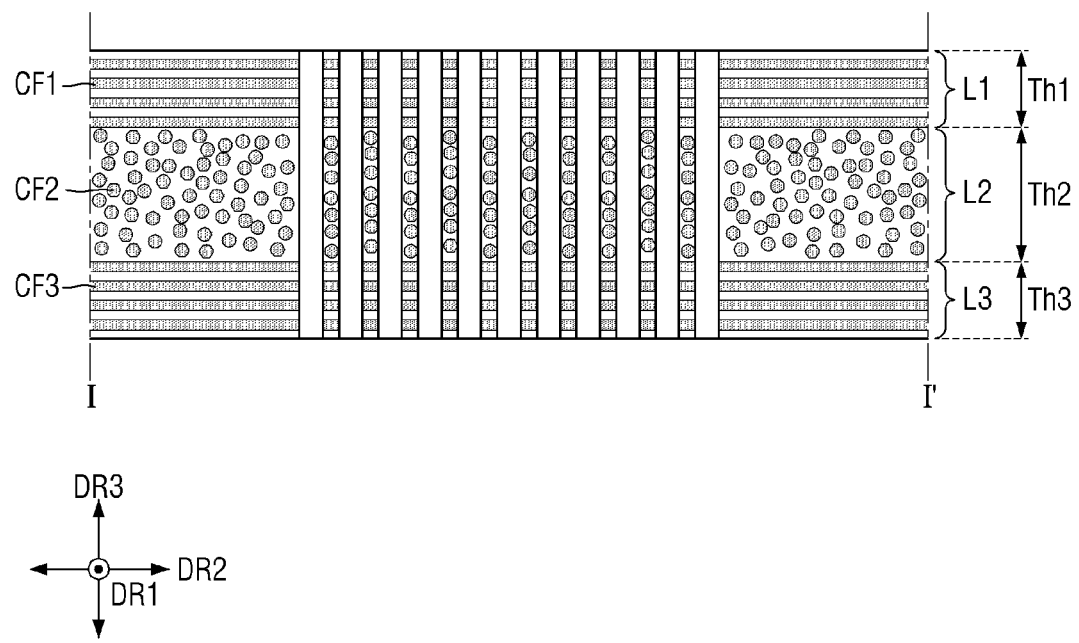
FIG. 8 is a cross-sectional view of an embodiment of the panel support member taken along line I-I' of FIG. 7.
Figure 9:
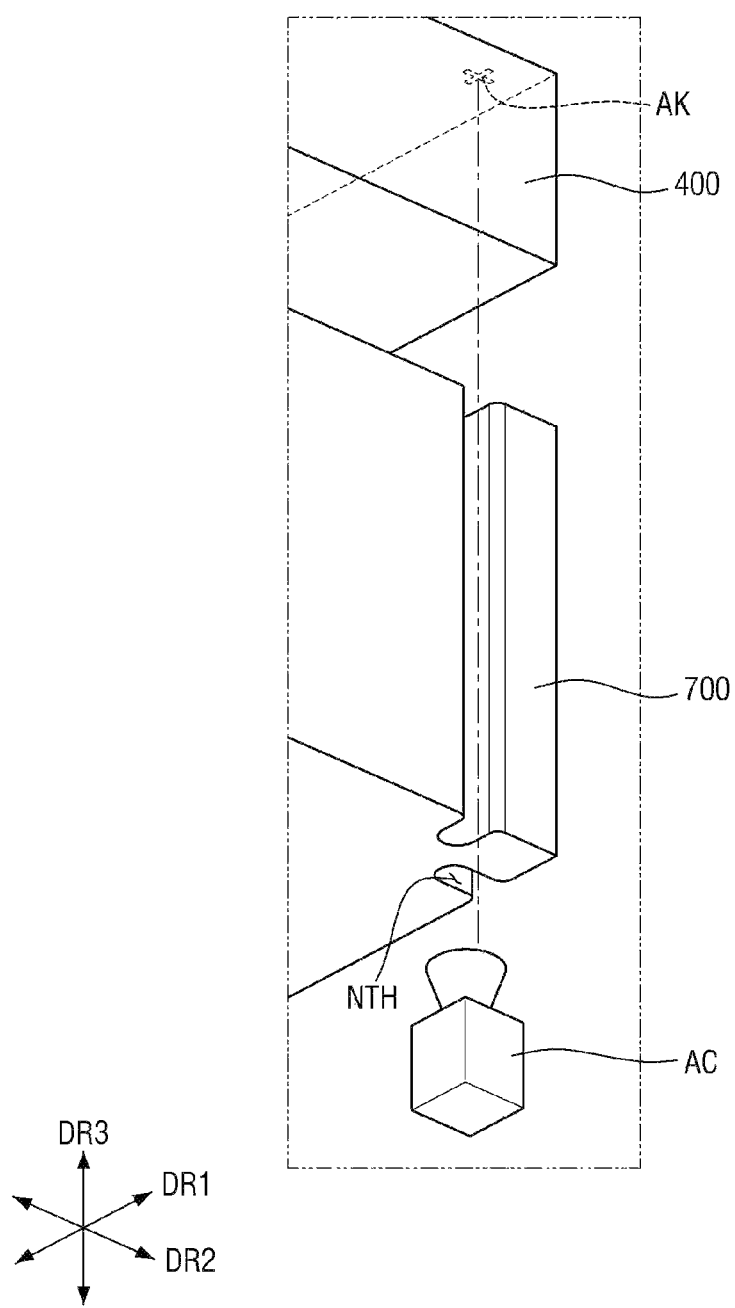
FIG. 9 illustrates an embodiment of an alignment mark of the display panel and a notch of the panel support member.
Figure 10:
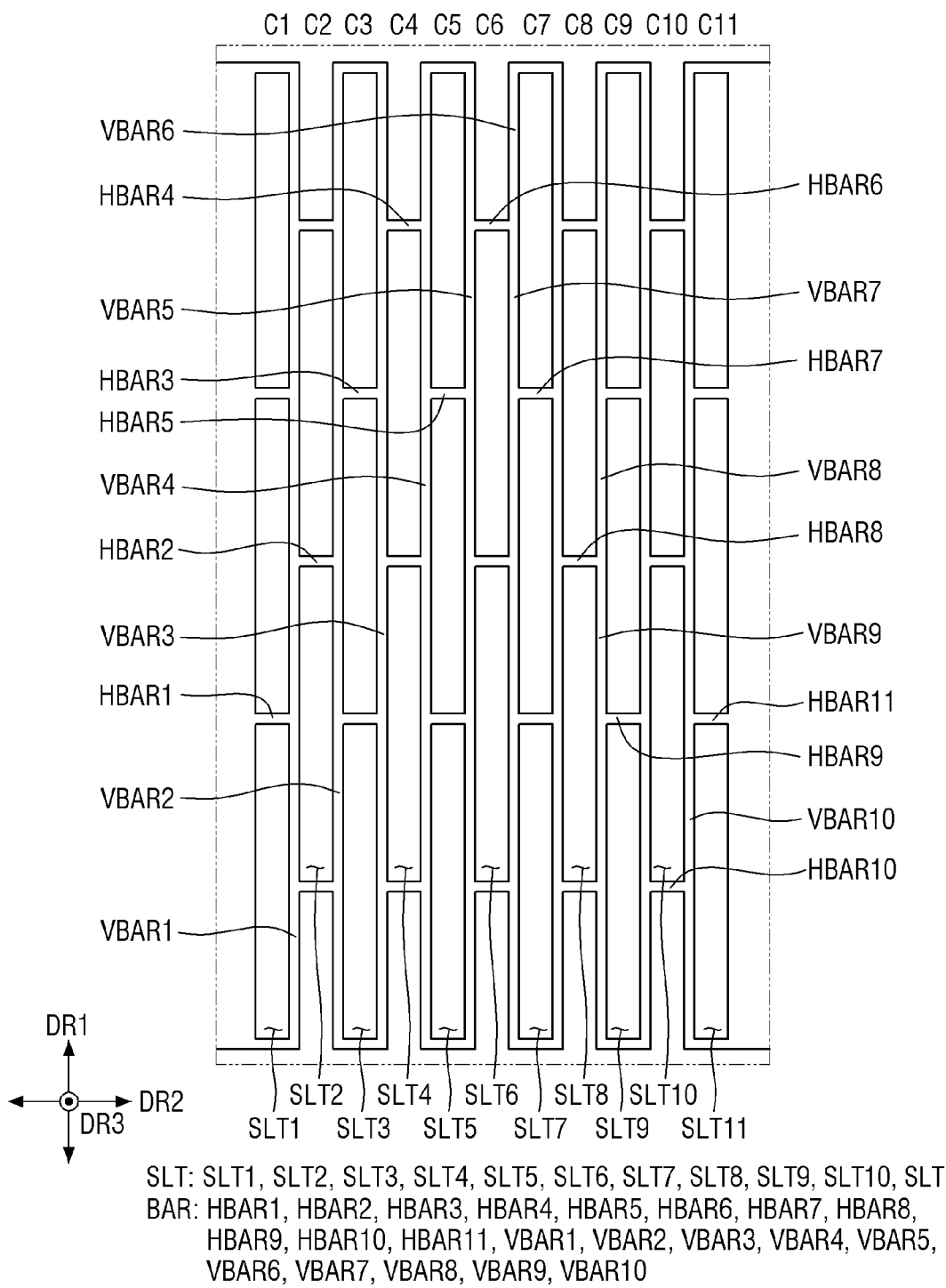
FIG. 10 is a detailed plan view of an embodiment of a lattice pattern of the panel support member of FIG. 7.

FIG. 6 is a perspective view of an embodiment of the panel support member 700 of FIGS. 3 and 4. FIG. 7 is a plan view of an embodiment of the panel support member 700 of FIGS. 3 and 4. FIG. 8 is a cross-sectional view of an embodiment of the panel support member 700 taken along line I-I' of FIG. 7. FIG. 9 illustrates an embodiment of an alignment mark AK of the display panel 400 and a notch NTH of the panel support member 700. FIG. 10 is a detailed plan view of an embodiment of a lattice pattern 710 of the panel support member 700 of FIG. 7.

Referring to FIGS. 6 through 10, the panel support member 700 may be a polymer including carbon fibers or glass fibers and a resin. In an embodiment, when the panel support member 700 includes carbon fibers, the resin may be epoxy, polyester, polyimide, polycarbonate, polypropylene, polybutylene, or vinyl ester. In an embodiment, when the panel support member 700 includes glass fibers, the resin may be epoxy, polyester, polys aide, or vinyl ester.

The panel support member 700 may include a first layer L1, a second layer L2, and a third layer L3 as illustrated in FIG. 8. The first layer L1 may be a prepreg including a first fiber yarn (or fiber thread) CF1 extending in the second direction DR2. The second layer L2 may be a prepreg including a second fiber yarn CF2 extending in the first direction DR1. The third layer L3 may be a prepreg including a third fiber yarn CF3 extending in the second direction DR2. Each of the first fiber yarn CF1, the second fiber yarn CF2, and the third fiber yarn CF3 may be a carbon fiber yarn or a glass fiber yarn. In an embodiment, each of the first fiber yarn CF1, the second fiber yarn CF2, and the third fiber yarn CF3 may have a width of about 7 micrometers (μm) to about 10 μm, but the invention is not limited thereto. The first layer L1, the second layer L2, and the third layer L3 may be stacked by hot pressing or an autoclave. The first direction DR1 and the second direction DR2 may be orthogonal to each other. In addition, the first direction DR1 may be parallel to a first folding line FL1 (refer to FIGS. 2A and 2B) and a second folding line FL2 (refer to FIGS. 2A and 2B).

The direction in which the second fiber yarn CF2 of the second layer L2 extends and the direction in which the folding lines FL1 and FL2 extend are the same as the first direction DR1. Therefore, the second layer L2 may be easily folded when the display device 10 is folded. However, when the panel support member 700 includes only the second layer L2 having the second fiber yarn CF2, the panel support member 700 may be bent or curved in the first direction DR1. That is, when the panel support member 700 includes only the second layer L2 having the second fiber yarn CF2, the flatness and rigidity of the panel support member 700 may be low.

Since the panel support member 700 includes not only the second layer L2 but also the first layer L1 having the first fiber yarn CF1 extending in the second direction DR2 and the third layer L3 having the third fiber yarn CF3 extending in the second direction DR2, the panel support member 700 may be prevented from being curved or bent in the first direction DR1, and the rigidity of the panel support member 700 may be increased.

However, a thickness Th2 of the second layer L2 may be greater than a thickness Th1 of the first layer L1 and a thickness Th3 of the third layer L3 in consideration of the folding direction of the panel support member 700. The thickness of the first layer L1 and the thickness of the third layer L3 may be substantially the same, but the invention is not limited thereto. In an embodiment, the thickness of the second layer L2 may be about 120 μm, and the thickness of the first layer L1 and the thickness of the third layer L3 may be about 20 μm to about 30 μm, for example.

A thickness of the panel support member 700 may be greater than a thickness of the digitizer member 900 (refer to FIGS. 3 and 4). In addition, the thickness of the panel support member 700 may be greater than a thickness of the display panel 400 (refer to FIGS. 3 and 4). In an embodiment, the thickness of the panel support member 700 may be about 100 μm to about 300 μm, for example.

The panel support member 700 includes the lattice pattern 710, a first flat part 720, and a second flat part 730. The lattice pattern 710 may be disposed in the folding area FDA, the first flat part 720 may be disposed in the first non-folding area NFA1, and the second flat part 730 may be disposed in the second non-folding area NFA2.

A plurality of slits SLT may be defined by a plurality of bars BAR in the lattice pattern 710. Each of the slits SLT may be a hole passing through the panel support member 700 in the third direction DR3.

Each of the slits SLT may extend in the first direction DR1. That is, each of the slits SLT may be longer in the first direction DR1 than in the second direction DR2. The lattice pattern 710 including the slits SLT may have flexibility. That is, the lattice pattern 710 max be stretched in the second direction DR2 when the display device 10 is folded.

In FIG. 10, a plurality of slits SLT disposed in first through eleventh columns C1 through C11 are illustrated as an embodiment of the lattice pattern 710. Each of the slits SLT disposed in the first column C1 may be defined as a first slit SLT1, each of the slits SLT disposed in the second column C2 may be defined as a second slit SLT2, and each of the slits SLT disposed in the third column C3 may be defined as a third slit SLT3. Each of the slits SLT disposed in the fourth column C4 may be defined as a fourth slit SLT4, each of the slits SLT disposed in the fifth column C5 may be defined as a fifth slit SLT5, and each of the slits SLT disposed in the sixth column C6 may be defined as a sixth slit SLT6. Each of the slits SLT disposed in the seventh column C7 may be defined as a seventh slit SLT7, each of the slits SLT disposed in the eighth column C8 may be defined as an eighth slit SLT8, and each of the slits SLT disposed in the ninth column C9 may be defined as a ninth slit SLT9. Each of the slits SLT disposed in the tenth column C10 may be defined as a tenth slit SLT10, and each of the slits SLT disposed in the eleventh column C11 may be defined as an eleventh slit SLT11.

The bars BAR may include first through tenth vertical bars VBAR1 through VBAR10 and first through eleventh horizontal bars HBAR1 through HBAR11.

The first vertical bar VBAR1 may be disposed between the first slits SLT1 and the second slits SLT2, the second vertical bar VBAR2 may be disposed between the second slits SLT2 and the third slits SLT3, the third vertical bar VBAR3 may be disposed between the third slits SLT3 and the fourth slits SLT4, the fourth vertical bar VBAR4 may be disposed between the fourth slits SLT4 and the fifth slits SLT5, and the fifth vertical bar VBAR5 may be disposed between the fifth slits SLT5 and the sixth slits SLT6. The sixth vertical bar VBAR6 may be disposed between the sixth slits SLT6 and the seventh slits SLT7, the seventh vertical bar VBAR7 may be disposed between the seventh slits SLT7 and the eighth slits SLT8, the eighth vertical bar VBAR8 may be disposed between the eighth slits SLT8 and the ninth slits SLT9, the tenth vertical bar VBAR10 may be disposed between the tenth slits SLT10 and the eleventh slits SLT11.

The first horizontal bar HBAR1 may be disposed between the first slits SLT1 neighboring each other in the first direction DR1, the second horizontal bar HBAR2 may be disposed between the second slits SL2 neighboring each other in the first direction DR1, and the third horizontal bar HBAR3 may be disposed between the third slits SLT3 neighboring each other in the first direction DR1. The fourth horizontal bar HBAR4 may be disposed between the fourth slits SLT4 neighboring each other in the first direction DR1, the fifth horizontal bar HBAR5 may be disposed between the fifth slits SLT5 neighboring each other in the first direction DR1, and the sixth horizontal bar HBAR6 may be disposed between the sixth slits SLT6 neighboring each other in the first direction DR1. The seventh horizontal bar HBAR7 may be disposed between the seventh slits SLT7 neighboring each other in the first direction DR1, the eighth horizontal bar HBAR8 may be disposed between the eighth slits SLT8 neighboring each other in the first direction DR1, the ninth horizontal bar HBAR9 may be disposed between the ninth slits SLT9 neighboring each other in the first direction DR1, the tenth horizontal bar HBAR10 may be disposed between the tenth slits SLT10 neighboring each other in the first direction DR1, and the eleventh horizontal bar HBAR11 may be disposed between the eleventh slits SLT11 neighboring each other in the first direction DR1.

The first slits SLT1, the second slits SLT2, the third slits SLT3, and the fourth slits SLT4 may be sequentially disposed in the second direction DR2. The first slits SLT2 and the fourth slits SLT4 among the first slits SLT1, the second slits SLT2, the third slits SLT3, and the fourth slits SLT4 sequentially disposed in the second direction DR2 may be shifted in the first direction DR1 compared with the first slits SLT1 and the third slits SLT3. Therefore, a lower half of the first slits SLT1, an upper half of the second slits SLT2, a lower half of the third slits SLT3, and an upper half of the fourth slits SLT4 may overlap each other in the second direction DR2. Alternatively, an upper half of the first slits SLT1, a lower half of the second slits SLT2, an upper half of the third slits SLT3, and a lower half of the fourth slits SLT4 may overlap each other in the second direction DR2.

In addition, the first horizontal bars HBAR1 and the third horizontal bars HBAR3 may be disposed side by side in the second direction DR2, and the second horizontal bars HBAR2 and the fourth horizontal bars HBAR4 may be disposed side by side in the second direction DR2. Further, the second horizontal bars HBAR2 may be disposed between the first slits SLT1 and the third slits SLT3, and the third horizontal bars HBAR3 may be disposed between the second slits SLT2 and the fourth slits SLT4.

A front surface of each of the first flat part 720 and the second flat part 730 may be formed or provided to be flat. One or more notches NTH may be defined in each of side surfaces of the first flat part 720 and the second flat part 730. The notches NTH may be defined in the shape of grooves or ditches extending in the third direction DR3. Each of the notches NTH may be a recessed part of the side surface of the first flat part 720 or the second flat part 730.

A notch NTH may overlap an alignment mark AK disposed on the front surface of the display panel 400 in the third direction DR3 as illustrated in FIG. 9. Accordingly, an alignment camera AC, the notch NTH, and the alignment mark AK may be aligned in the third direction DR3. Therefore, the alignment mark AK disposed on the front surface of the display panel 400 may be photographed by the alignment camera AC through the notch NTH. Therefore, the display panel 400 may be aligned with another element (e.g., the digitizer member 900) by aligning the alignment mark AK of the display panel 400 with an alignment mark of another element (e.g., the digitizer member 900) through the alignment camera AC.

In addition, the through hole STH passing through the panel support member 700 may be disposed in the first flat part 720. The through hole STH may be defined adjacent to an edge of the first flat part 720.

Figure 11:
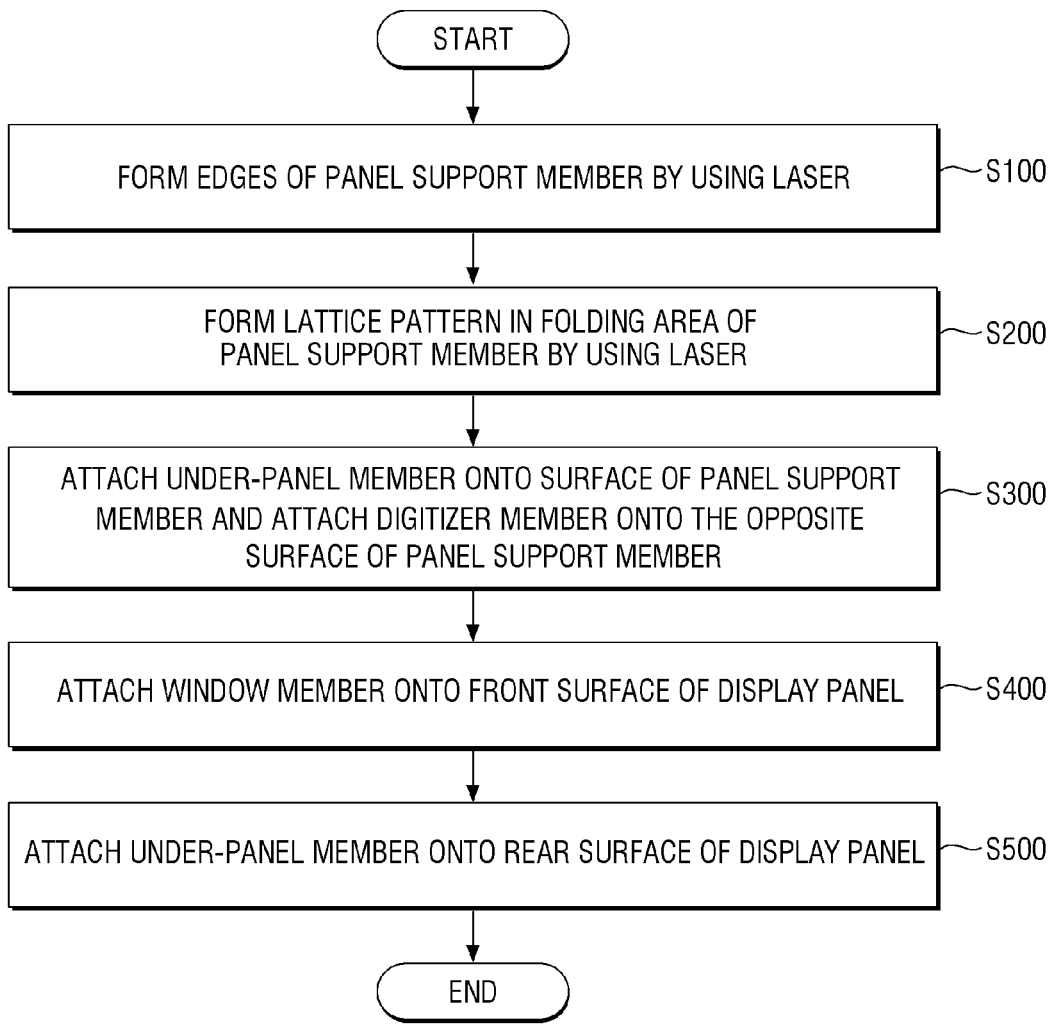
FIG. 11 is a flowchart illustrating an embodiment of a method of manufacturing a display device.

FIG. 11 is a flowchart illustrating an embodiment of a method of manufacturing a display device. The method of manufacturing the display device in the embodiment will now be described in detail with reference to FIG. 11.

First, a panel support member 700 having edges suitable for a display panel 400 of a display device 10 is formed or provided by cutting a original panel support member 700_1 using intense light (e.g., laser) of a light-emitting device (e.g., laser device). In an embodiment, through the cutting, notches NTH for exposing alignment marks AK of the display panel 400 in the third direction DR3 without covering the alignment marks AK may be defined in the panel support member 700 (operation S100 of FIG. 11), for example.

Figure 12:
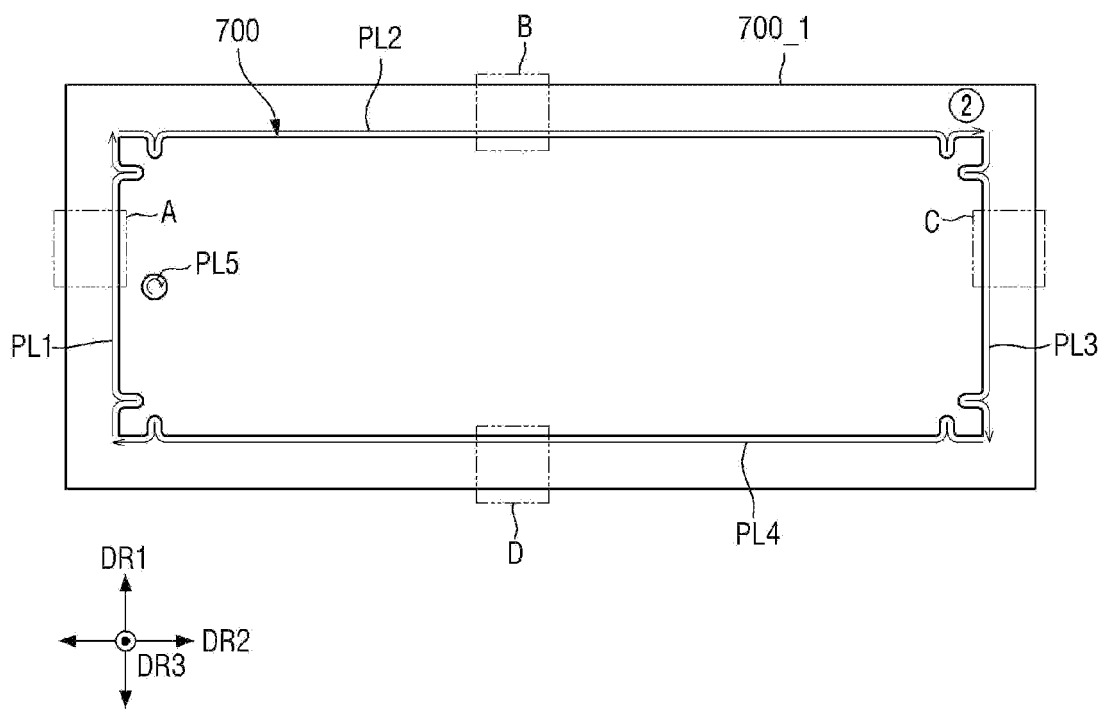
FIG. 12 illustrates an embodiment of an edge machining order of a panel support member.

Referring to FIG. 12, the laser device outputs a laser along a first cutting line PL1 and then outputs a laser along a second cutting line PL2. Then, the laser device outputs a laser along a third cutting line PL3 and then outputs a laser along a fourth cutting line PL4. The laser device outputs a laser several to tens of times along the first through fourth cutting lines PL1 through PL4, thereby cutting the edges of the panel support member 700. The number of times that the laser device outputs a laser may vary according to the energy of the laser.

The first cutting line PL1 may be a line for forming a first side (e.g., a left side) of the panel support member 700 in a plan view. A left surface of the panel support member 700 may be formed or provided by the first cutting line PL1. The first cutting line PL1 may extend in the first direction DR1 except for the notches NTH.

The second cutting line PL2 may be a line for forming a second side (e.g., an upper side) of the panel support member 700 in a plan view. An upper surface of the panel support member 700 may be formed or provided by the second cutting line PL2. The second cutting line PL2 may extend in the second direction DR2 except for the notches NTH.

The third cutting line PL3 may be a line for forming a third side (e.g., a right side) of the panel support member 700 in a plan view A right surface of the panel support member 700 may be formed or provided by the third cutting line PL3. The third cutting line PL3 may extend in the first direction DR1 except for the notches NTH.

The fourth cutting line PL4 may be a line for forming a fourth side (e.g., a lower side) of the panel support member 700 in a plan view. A lower surface of the panel support member 700 may be formed or provided by the fourth cutting line PL4. The fourth cutting line PL4 may extend in the second direction DR2 except for the notches NTH.

After the edges of the panel support member 700 are completed along the first through fourth cutting lines PL1 through PL4, the laser device may output a laser several to tens of times along a fifth cutting line PL5, thereby machining a through hole STH of the panel support member 700. The fifth cutting line PL5 may have substantially the same planar shape as that of the through hole STH.

Figure 13:
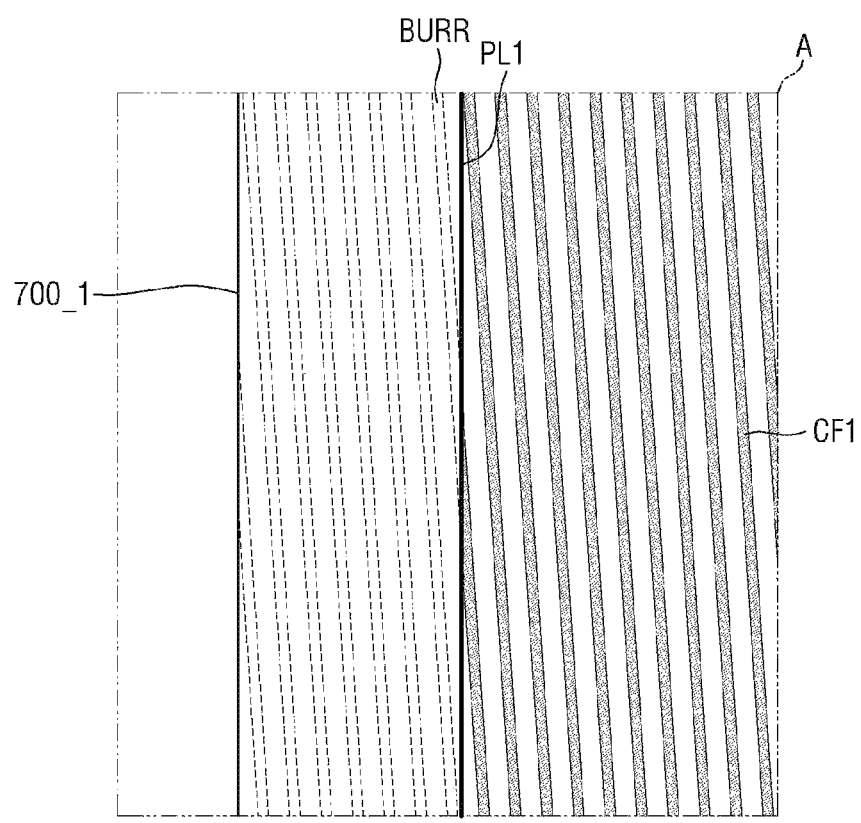
FIG. 13 is a view illustrating a byproduct according to an extending direction of fiber yarn of a third layer of the panel support member and a laser movement direction in area A of FIG. 12.

In area A, a third fiber yarn CF3 of a third layer L3 of the panel support member 700 extends in the first direction DR1, and the first cutting line PL1 also extends in the first direction DR1. However, the extending direction of the first cutting line PL1 and the extending direction of the third fiber yarn CF3 may not completely coincide with each other. Therefore, when the panel support member 700 is cut along the first cutting line PL1 by a laser, the third fiber yarn CF3 may not be properly cut, and a cut part of the third fiber yarn CF3 may remain in the form of a byproduct BURR. In FIG. 13, the third fiber yarn CF3 removed by cutting the panel support member 700_1 along the first cutting line PL1 area A is shown in dotted lines for ease of description.

In addition, referring to FIG. 13, in area A, a first fiber yarn CF1 of a first layer L1 (refer to FIG. 8) of the panel support member 700 may also extend in the first direction DR1. However, the extending direction of the first cutting line PL1 and the extending direction of the first fiber yarn CF1 may not completely coincide with each other. Therefore, when the panel support member 700 is cut along the first cutting line PL1 by a laser, the first fiber yarn CF1 may not be properly cut, and a cut part of the first fiber yarn CF1 may remain in the form of a byproduct BURR.

Further, in area C, as in area A, a cut part of the first fiber yarn CF1 or the third fiber yarn CF3 of the panel support member 700 may remain in the form of a byproduct BURR.

Figure 14:
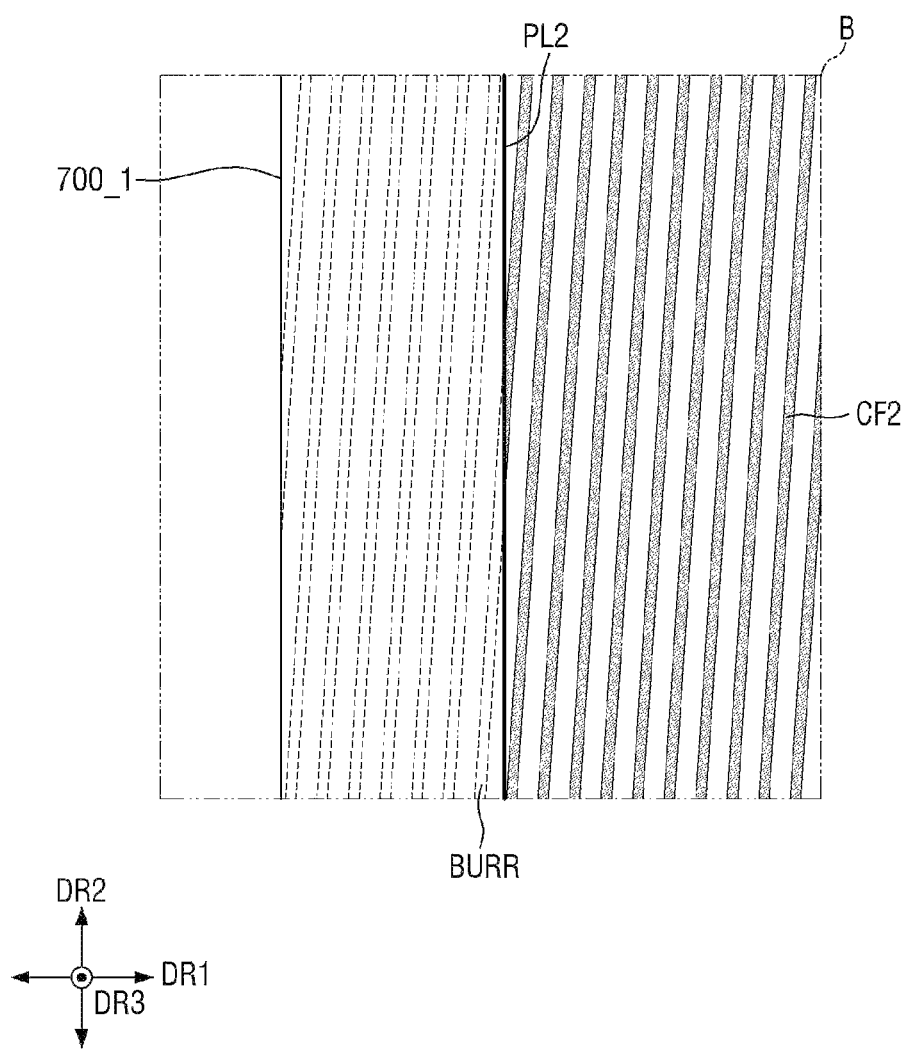
FIG. 14 is a view illustrating a byproduct according to an extending direction of fiber yarn of a second layer of the panel support member and a laser movement direction in area B of FIG. 12.

Referring to FIG. 14, in area B, a second fiber yarn CF2 of a second layer L2 (refer to FIG. 8) of the panel support member 700 extends in the second direction DR2, and the second cutting line PL2 also extends in the second direction DR2. However, the extending direction of the second cutting line PL2 and the extending direction of the second fiber yarn CF2 may not completely coincide with each other. Therefore, when the panel support member 700 is cut along the second cutting line PL2 by a laser, the second fiber yarn CF2 may not be properly cut, and a cut part of the second fiber yarn CF2 may remain in the form of a byproduct BURR. In FIG. 14, the second fiber yarn CF2 removed by cutting the panel support member 700_1 along the second cutting line PL2 in area B is shown in dotted lines for ease of description.

Further, in area D, as in area B, a cut part of the second fiber yarn CF2 of the panel support member 700 may remain in the form of a byproduct BURR.

As illustrated in FIGS. 13 and 14, a cut part of the first fiber yarn CF1 or the third fiber yarn CF3 may remain as the byproduct BURR in area A, and a cut part of the second fiber yarn CF2 may remain as the byproduct BURR in area B. More specifically, when the laser device outputs a laser of high energy to reduce the processing time for cutting the edges of the panel support member 700, high thermal energy may be generated on a surface cut by the laser. The thermal energy may cause a resin holding the fiber yarns CF1 through CF3 in the panel support member 700 to fall off. Accordingly, a cut part of the first fiber yarn CF1, the second fiber yarn CF2, or the third fiber yarn CF3 may protrude outward from the cut surface of the panel support member 700 and remain as the byproduct BURR.

In this case, when an alignment mark AK of the display panel 400 is photographed using an alignment camera AC as illustrated in FIG. 9, the alignment mark AK may not be properly recognized due to the byproduct BURR. In addition, when a cut part of the first fiber yarn CF1, the second fiber yarn CF2, or the third fiber yarn CF3 remains as the byproduct BURR in area A, the processing time may be increased by an alarm generated in a process of monitoring the side surfaces of the panel support member 700. Therefore, the energy of a laser output from the laser device needs to be lowered to prevent a cut part of the first fiber yarn CF1, the second fiber yarn CF2, or the third fiber yarn CF3 from remaining as the byproduct BURR on the side surfaces of the panel support member 700.

A laser used to cut the edges of the panel support member 700 may be an ultraviolet laser or an infrared laser. The ultraviolet laser refers to a laser that emits light having energy of an ultraviolet wavelength, and the infrared laser refers to a laser that emits light having energy of an infrared wavelength. In an embodiment, the ultraviolet wavelength may be about 10 nanometers (nm) to about 400 nm, and the infrared wavelength may be about 750 nm to about 1 μm.

The energy of the laser may be adjusted by a scan speed of the laser, a pulse period of the laser, a pulse repetition rate of the laser, and power of the laser. The inventors of the invention have calculated, through repeated experiments, the scan speed of the laser, the pulse period of the laser, the pulse repetition rate of the laser, and the power of the laser for preventing a cut part of the first fiber yarn CF1, the second fiber yarn CF2 or the third fiber yarn CF3 from remaining as the byproduct BURR on the side surfaces of the panel support member 700 as shown in Table 1.

TABLE 1

| Wavelength band | Ultraviolet light | | Infrared light |
| --- | --- | --- | --- |
| Pulse period | ns | ps/fs | ps/fs |
| Scan speed (mm/s) | 800 mm/s or less | 5000 mm/s or less | 1000 mm/s or less |
| Pulse repetition rate (kHz) | 200 kHz or less | 3000 kHz or less | 2000 kHz or less |
| Power (W) | 13 W or less | 50 W or less | 20 W or less |

In Table 1, the wavelength band of the laser may be divided into an ultraviolet wavelength band and an infrared wavelength band. The scan speed of the laser, the pulse period of the laser, the pulse repetition rate of the laser, and the power of the laser may vary according to the wavelength band of the laser. In addition, the scan speed of the laser, the pulse repetition rate of the laser, and the power of the laser may vary according to the pulse period of the laser.

Figure 16A:
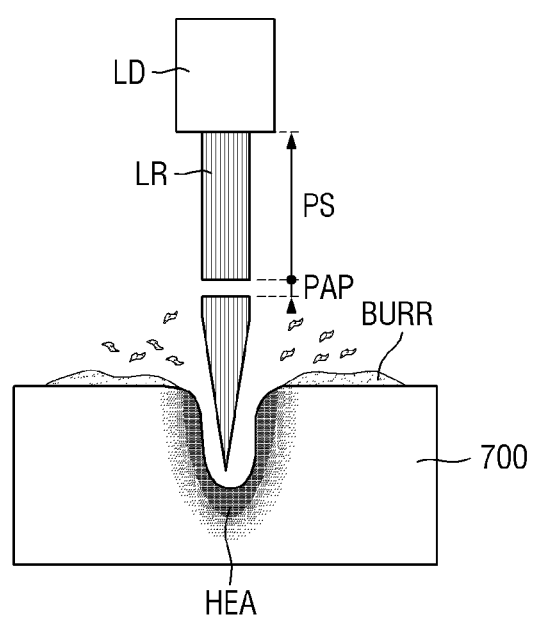
FIGS. 16A to 16C are views illustrating a thermal energy area generated by a laser according to a pulse period of the laser.
Figure 16B:
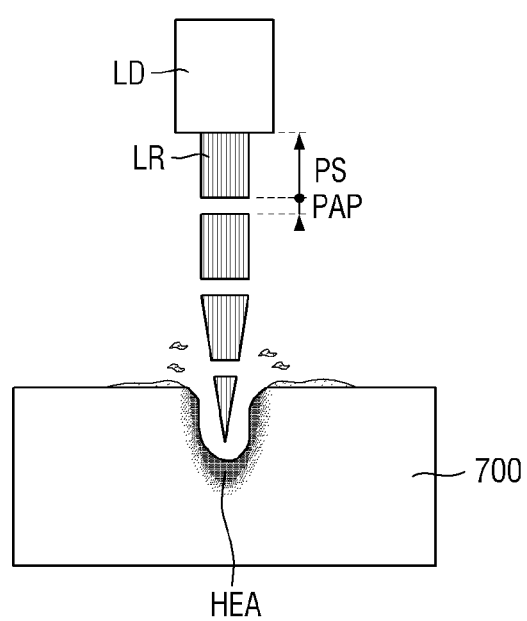
Figure 16C:
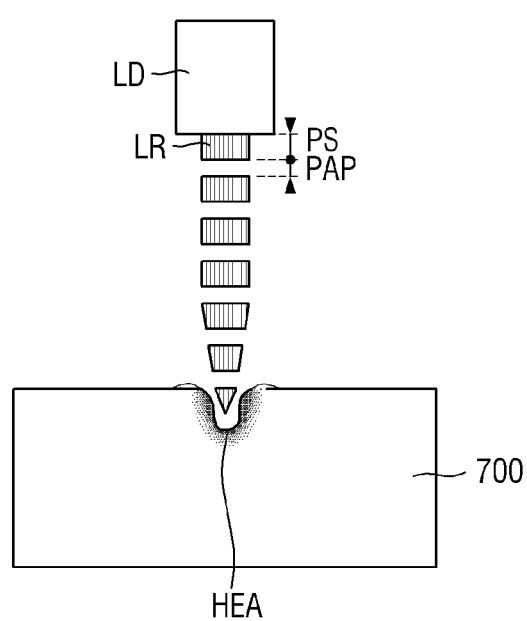

The pulse period of the laser refers to a period in which the laser is output when the laser is output in a periodic waveform, like a predetermined pulse. As illustrated in FIGS. 16A to 16C, a pause period PAP in which the laser is not output may be disposed between pulse periods PS. In the case of an ultraviolet laser, the pulse period may be in units of nanoseconds (ns) or in units of picoseconds (ps) or femtoseconds (fs). In the case of an infrared laser, the pulse period of the laser may be in units of picoseconds (ps) or femtoseconds (fs). A nanosecond unit refers to several to hundreds of nanoseconds, a picosecond unit refers to several to hundreds of picoseconds, and a femtosecond unit refers to several to hundreds of femtoseconds.

The scan speed of the laser refers to the speed at which the laser device outputting the laser moves in a cutting direction. That is, the scan speed of the laser may refer to the speed at which the laser device emits the laser while moving along the first through fourth cutting lines PL1 through PL4.

The pulse repetition rate of the laser refers to the number of pulses transmitted from the laser device per second.

Figure 15:
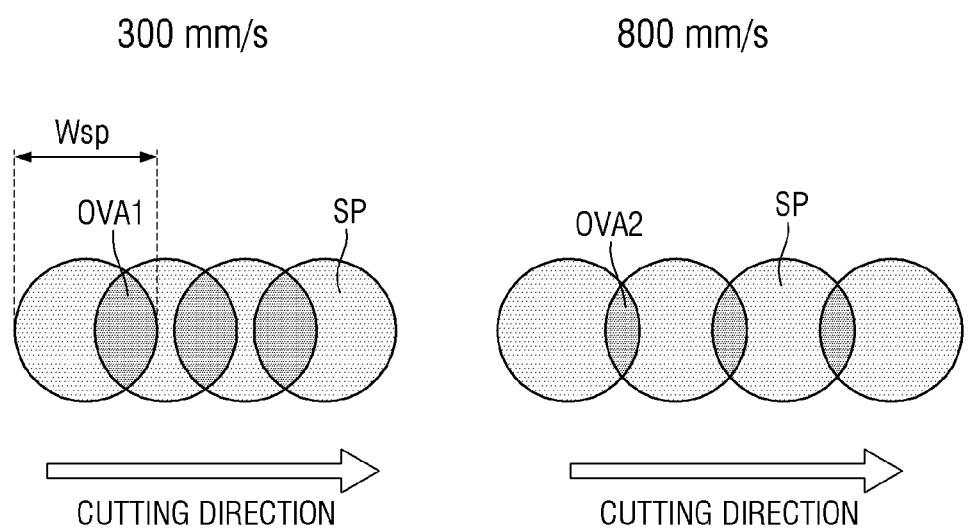
FIG. 15 is a view illustrating laser spots according to a scan speed of a laser.

As illustrated in FIG. 15, when the laser device outputs a laser while moving along a cutting direction, spots SP of the laser may be defined according to the pulse period of the laser. Each of the spots SP of the laser may have a circular planar shape. In this case, a diameter Wsp of each of the spots SP of the laser may be about 20 μm, but the invention is not limited thereto. When the pulse repetition rate of the laser is constant, an overlap rate OVA1 of the laser spots SP when the scan speed of the laser is about 300 millimeters per second (mm/s) may be greater than an overlap rate OVA2 of the laser spots SP when the scan speed of the laser is about 800 mm/s. In addition, when the scan speed of the laser is constant, the overlap rate of the laser spots SP may increase as the pulse repetition rate of the laser increases. Since the overlap area between the spots SP of the laser increases as the overlap rate of the spots SP of the laser increases, the energy of the laser may increase. Accordingly, higher thermal energy may be generated on a surface cut by the laser. Therefore, when the overlap rate of the laser spots SP is reduced, the energy of the laser may be reduced. Accordingly, when the scan speed of the laser is increased or when the pulse repetition rate of the laser is reduced, the energy of the laser may be reduced.

FIG. 16A illustrates a laser device LD that outputs a laser LR during a pulse period PS having a unit of nanoseconds (ns). FIG. 16B illustrates a laser device LD that outputs a laser LR during a pulse period PS having a unit of picoseconds (ps). FIG. 16C illustrates a laser device LD that outputs a laser LR during a pulse period PS having a unit of femtoseconds (fs).

As illustrated in FIGS. 16A to 16C, as the pulse period PS of the laser LR increases, the laser LR having higher energy is output. Accordingly, higher thermal energy may be applied to the panel support member 700 by the laser LR. Therefore, a thermal energy area HEA applied to the panel support member 700 by the laser LR may be wide. Hence, as the pulse period PS of the laser LR is reduced, the energy of the laser LR may be reduced. Therefore, in order to reduce the energy of the laser LR, when the pulse period PS of the laser LR is in units of nanoseconds (ns), the scan speed of the laser LR may be increased or the pulse repetition rate of the laser LR may be reduced compared with a case when the pulse period PS of the laser LR is in units of picoseconds (ps) or femtoseconds (fs).

As shown in Table 1, in order to prevent a cut part of the first fiber yarn CF1, the second fiber yarn CF2, or the third fiber yarn CF3 from remaining as the byproduct BURR, in the case of an ultraviolet laser having a pulse period of nanoseconds (ns), the scan speed of the laser may be about 800 mm/s or less, the pulse repetition rate of the laser may be about 200 kHz or less, and the power of the laser may be about 13 watts (W) or less. In addition, in the case of an ultraviolet laser having a pulse period of picoseconds (ps) or femtoseconds (fs), the scan speed of the laser may be about 5000 mm/s or less, the pulse repetition rate of the laser may be about 3000 kHz or less, and the power of the laser may be about 50 W or less. Further, in the case of an infrared laser having a pulse period of picoseconds (ps) or femtoseconds (fs), the scan speed of the laser may be about 1000 mm/s or less, the pulse repetition rate of the laser may be about 2000 kHz or less, and the power of the laser may be about 20 W or less.

Second, a lattice pattern 710 is formed or provided in a folding area FDA of the panel support member 700 by a laser of the laser device. A plurality of slits SLT may be defined in the lattice pattern 710 by a plurality of bars BAR (operation S200 of FIG. 11).

Figure 17:
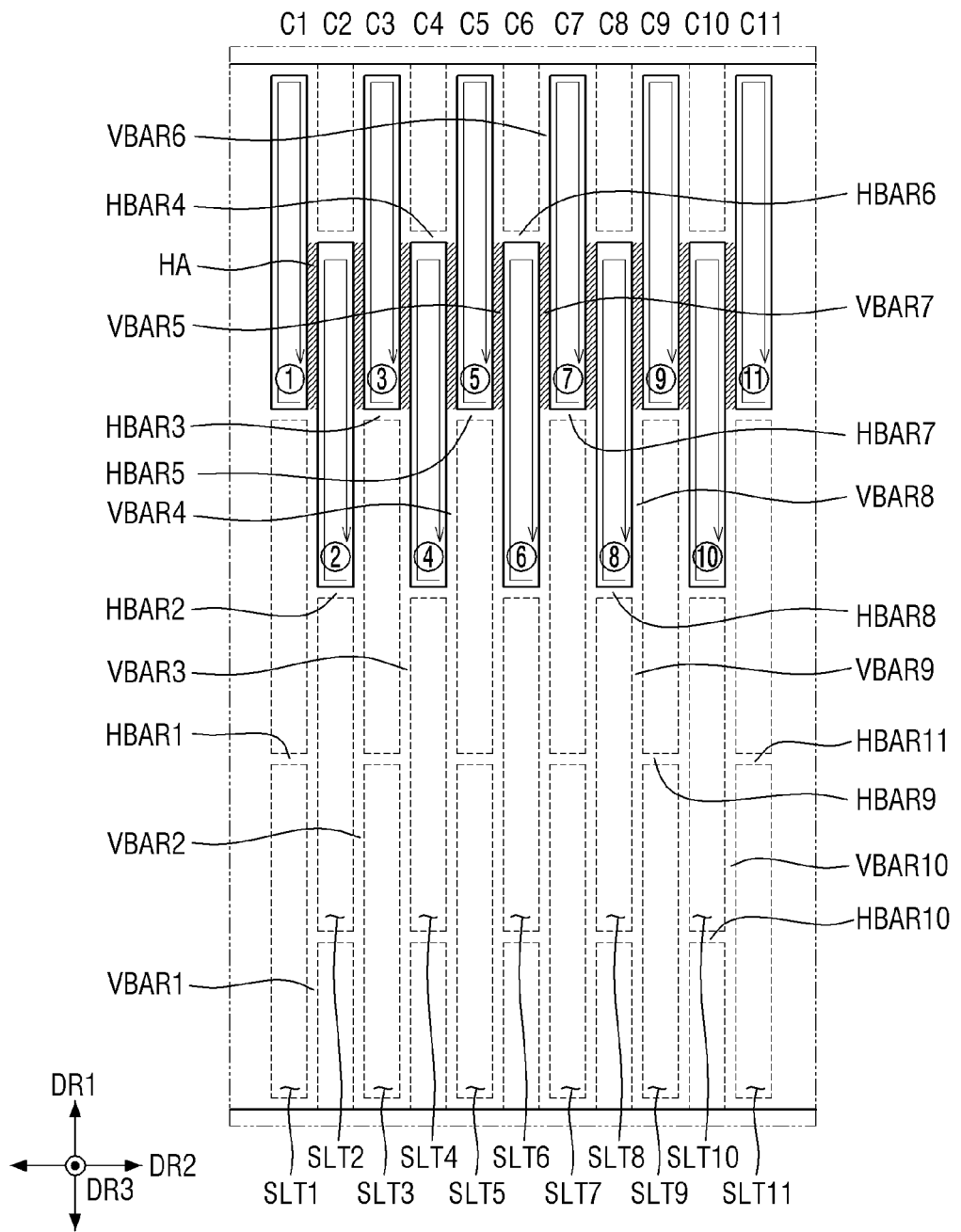
FIG. 17 illustrates an embodiment of a machining order of a lattice pattern of a panel support member.

As illustrated in FIG. 17, first through eleventh slits SLT1 through SLT11 disposed in the second direction DR2 may be sequentially defined using a laser. In an embodiment, a first slit SLT1 may be defined using a laser, and then a second slit SLT2 neighboring the first slit SLT1 in the second direction DR2 may be defined, for example. Then, a third slit SLT3 neighboring the second slit SLT2 in the second direction DR2 may be defined. In this case, thermal energy due to the laser may be accumulated in an area HA of a first vertical bar VBAR1 disposed between the first slit SLT1 and the second slit SLT2. In addition, thermal energy due to the laser may be accumulated in an area HA of a second vertical bar VBAR2 disposed between the second slit SLT2 and the third slit SLT3.

Similarly, thermal energy due to a laser may also be accumulated in an area HA of a third vertical bar VBAR3 disposed between the third slit SLT3 and a fourth slit SLT4, in an area HA of a fourth vertical bar VBAR4 disposed between the fourth slit SLT4 and a fifth slit SLT5, in an area HA of a fifth vertical bar VBAR5 disposed between the fifth slit SLT5 and a sixth slit SLT6, and in an area HA of a sixth vertical bar VBAR6 disposed between the sixth slit SLT6 and a seventh slit SLT7. In addition, thermal energy due to a laser may be accumulated in an area HA of a seventh vertical bar VBAR7 disposed between the seventh slit SLT7 and an eighth slit SLT8, in an area HA of an eighth vertical bar VBAR8 disposed between the eighth slit SLT8 and a ninth slit SLT9, in an area HA of a ninth vertical bar VBAR9 disposed between the ninth slit SLT9 and a tenth slit SLT10, and in an area HA of a tenth vertical bar VBAR10 disposed between the tenth slit SLT1 and an eleventh slit SLT11.

Figure 18A:
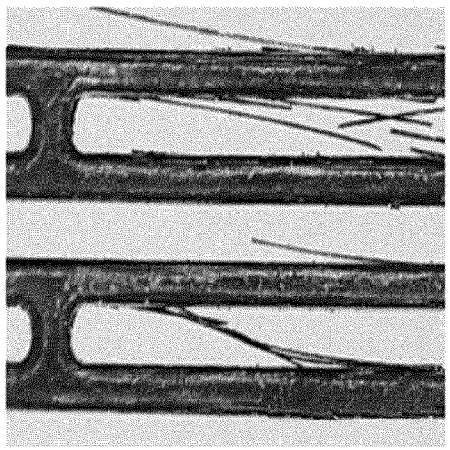
FIGS. 18A to 18D show images of a plane and a side surface of a bar of the lattice pattern of the panel support member.
Figure 18B:
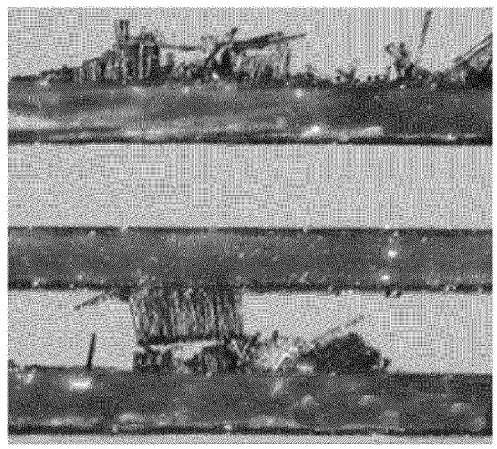
Figure 18C:
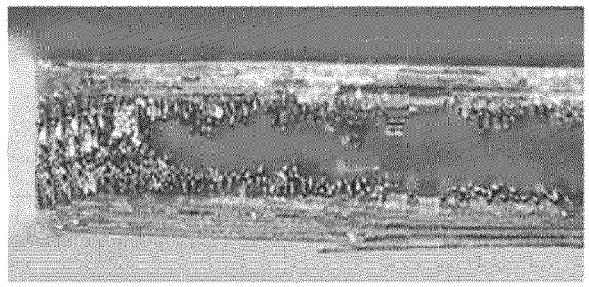
Figure 18D:
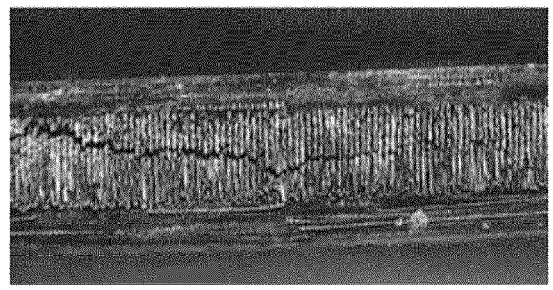

FIGS. 18A and 18B are plan views of a lattice pattern, and FIGS. 18C and 18D are side views or cross-sectional views of the lattice pattern. In the areas HA in which thermal energy due to a laser is accumulated, a resin holding the fiber yarns CF1 through CF3 may fall off, or cracks may be created in the resin as illustrated in FIGS. 18A to 18D. Therefore, a cut part of the first fiber yarn CF1, the second fiber yarn CF2, or the third fiber yarn CF3 may protrude outward and remain as the byproduct BURR.

Figure 19:
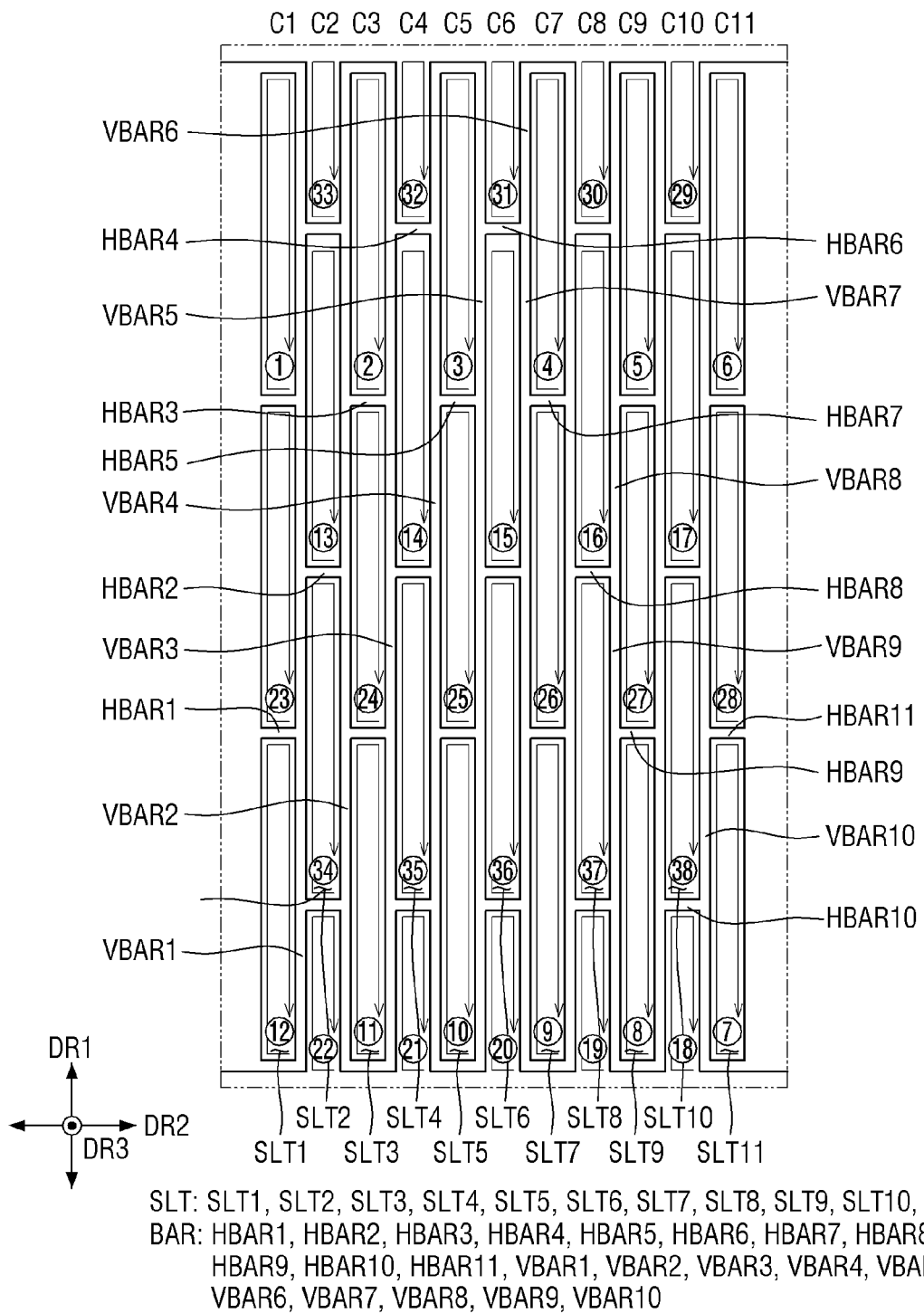
FIG. 19 is a plan view illustrating an embodiment of a machining order of a lattice pattern of a panel support member.

By changing the forming order of the slits SLT as illustrated in FIG. 19 so as not to successively define the slits SLT neighboring each other in the first direction DR1 and the second direction DR2, it is possible to prevent a cut part of the first fiber yarn CF1, the second fiber yarn CF2, or the third fiber yarn CF3 from protruding outward and remaining as the byproduct BURR.

In an embodiment, any one of the first slits SLT1 may be defined first, and then a third slit SLT3, a fifth slit SLT5, a seventh slit SLT7, a ninth slit SLT9, and an eleventh slit SLT11 overlapping the first slit SLT1 defined for the first time in the second direction DR2 may be sequentially defined (refer to ① through ⑥ of FIG. 19), for example. That is, a first slit SLT1 may be defined, a second slit SLT2 may be skipped, a third slit SLT3 may be defined, a fourth slit SLT4 may be skipped, a fifth slit SLT5 may be defined, a sixth slit SLT6 may be skipped, a seventh slit SLT7 may be defined, an eighth slit SLT8 may be skipped, a ninth slit SLT9 may be defined, a tenth slit SLT10 may be skipped, and an eleventh slit SLT11 may be defined. In this case, a slit SLT2/SLT4/SLT6/SLT8/SLT10 in an even column may be defined between neighboring slits among the slits SLT1, SLT3, SLT5, SLT7, SLT9, and SLT11 in odd columns defined for the first through sixth times. Therefore, thermal energy due to a laser may not be accumulated in any one of the bars BAR.

In addition, after the eleventh slit SLT11 is defined for the sixth time, another eleventh slit sum overlapping the eleventh slit SLT11 in the first direction DR1 may be defined for the seventh time. In this case, the eleventh slit SLT11 defined for the sixth time and the eleventh slit SLT11 defined for the seventh time may not neighbor each other. That is, an eleventh slit SLT11 neighboring the eleventh slit SLT11 defined for the sixth time in the first direction DR1 may be skipped, and the eleventh slit SLT11 neighboring the skipped eleventh slit SLT11 in the first direction DR1 may be defined.

Then, a ninth slit SLT9, a seventh slit SLT7, a fifth slit SLT5, a third slit SLT3, and a first slit SLT1 overlapping the eleventh slit SLT11 defined for the seventh time in the second direction DR2 may be sequentially defined (refer to ⑦ through ⑫ of FIG. 19). In this case, a slit SLT2/SLT4/SLT6/SLT8/SLT10 in an even column may be defined between neighboring slits among the slits SLT1, SLT3, SLT5, SLT7, SLT9, and SLT11 in odd columns defined for the seventh through twelfth times. Therefore, thermal energy due to a laser may not be accumulated in any one of the bars BAR.

In addition, after the first slit SLT1 is defined for the twelfth time, a second slit SLT2 neighboring the first slit SLT1 defined for the first time in the second direction DR2 may be defined for the thirteenth time. Then, a fourth slit SLT4, a sixth slit SLT6, an eighth slit SLT8, and a tenth slit SLT10 overlapping the second slit SLT2 defined for the thirteenth time in the second direction DR2 may be sequentially defined (refer to ⑬ through ⑰ of FIG. 19). In this case, a slit SLT3/SLT5/SLT7/SLT9 in an odd column may be defined between neighboring slits among the slits SLT2, SLT4, SLT6, SLT8, and SLT10 in even columns defined for the thirteenth through seventeenth times. Therefore, thermal energy due to a laser may not be accumulated in any one of the bars BAR.

In addition, after the tenth slit SLT10 is defined for the seventeenth time, another tenth slit SLT10 overlapping the tenth slit SLT10 defined for the seventeenth time in the first direction DR1 may be defined for the eighteenth time. In this case, the tenth slit SLT10 defined for the seventeenth time and the tenth slit SLT10 defined for the eighteenth time may not neighbor each other. The tenth slit SLT10 defined for the eighteenth time may neighbor the eleventh slit SLT11 defined for the seventh time in the second direction DR2. Next, an eighth slit SLT8, a sixth slit SLT6, a fourth slit SLT4, and a second slit SLT2 overlapping the tenth slit SLT10 defined for the eighteenth time in the second direction DR2 may be sequentially defined (refer to ⑱ through ㉒ of FIG. 19). In this case, a slit SLT3/SLT5/SLT7/SLT9 in an odd column may be defined between neighboring slits among the slits SLT2, SLT4, SLT6, SLT8, and SLT10 in even columns defined for the eighteenth through twenty-second times. Therefore, thermal energy due to a laser may not be accumulated in any one of the bars BAR.

In addition, after the second slit SLT2 is defined for the twenty-second time, a first slit SLT1 disposed between the first slit SLT1 defined for the first time and the first slit SLT1 defined for the twelfth time may be defined for the twenty-third time. Then, a third slit SLT3, a fifth slit SLT5, a seventh slit SLT7, a ninth slit SLT9, and an eleventh slit SLT11 overlapping the first slit SLT1 defined for the twenty-third time in the second direction DR2 may be sequentially defined (refer to ㉓ through ㉘ of FIG. 19). In this case, a slit SLT2/SLT4/SLT6/SLT8/SLT10 in an even column may be defined between neighboring slits among the slits SLT1, SLT3, SLT5, SLT5, SLT7, SLT9, and SLT11 in odd columns defined for the twenty-third through twenty-eighth times. Therefore, thermal energy due to a laser may not be accumulated in any one of the bars BAR.

In addition, after the eleventh slit SLT11 is defined for the twenty-eighth time, a tenth slit SLT10 overlapping the eleventh slit SLT11 defined for the sixth time in the second direction DR2 may be defined for the twenty-ninth time. Then, an eighth slit SLT8, a sixth slit SLT6, a fourth slit SLT4, and a second slit SLT2 overlapping the tenth slit SLT10 defined for the twenty-ninth time in the second direction DR2 may be sequentially defined (refer to ㉙ through ㉝ of FIG. 19). In this case, a slit SLT3/SLT5/SLT7/SLT9 in an odd column may be defined between neighboring slits among the slits SLT2, SLT4, SLT6, SLT8, and SLT10 in even columns defined for the twenty-ninth through thirty-third times. Therefore, thermal energy due to a laser may not be accumulated in any one of the bars BAR.

Finally, after the second slit SLT2 is defined for the thirty-third time, a second slit SLT2 disposed between the second slit SLT2 defined for the thirteenth time and the second slit SLT2 defined for the twenty-second time may be defined for the thirty-fourth time. Then, a fourth slit SLT4, a sixth slit SLT6, an eighth slit SLT8, and a tenth slit SLT10 overlapping the second slit SLT2 defined for the thirty-fourth time in the second direction DR2 may be sequentially defined (refer to ㉞ through ㊳ of FIG. 19). In this case, a slit SLT3/SLT5/SLT7/SLT9 in an odd column may be defined between neighboring slits among the slits SLT2, SLT4, SLT6, SLT8, and SLT10 in even columns defined for the thirty-fourth through thirty-eighth times. Therefore, thermal energy due to a laser may not be accumulated in any one of the bars BAR.

As illustrated in FIG. 19, when the forming order of the slits SLT is determined such that the slits SLT neighboring each other in the first direction DR1 and the second direction DR2 are not successively defined, an area in which thermal energy due to a laser is accumulated may be removed from the bars BAR.

Figure 20A:
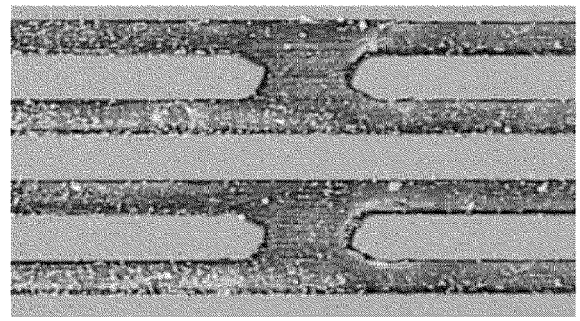
FIGS. 20A and 20B show images of an embodiment of a plane and a side surface of a bar of the lattice pattern of the panel support member.
Figure 20B:
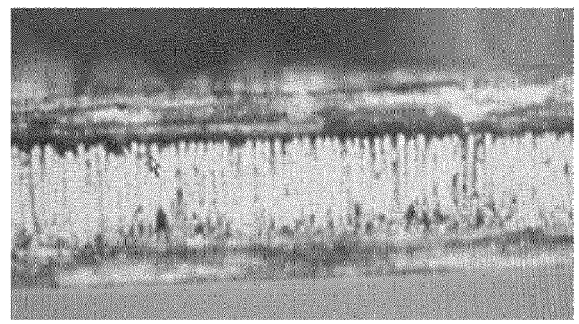

FIG. 20A is a plan view of a lattice pattern, and FIG. 20B is a side view or cross-sectional view of the lattice pattern. Since there is no area in which thermal energy due to a laser is accumulated, the resin holding the fiber yarns CF1 through CF3 does not fall off, or cracks are not created in the resin. Therefore, it is possible to prevent a cut part of the first fiber yarn CF1, the second fiber yarn CF2, or the third fiber yarn CF3 from protruding outward and remaining as the byproduct BURR.

Further, an under-panel member 600 is attached onto a surface of the completed panel support member 700, and a digitizer member 900 is attached onto an opposite surface of the panel support member 700 (operation S5300 of FIG. 11).

Referring back to FIGS. 3 and 4, the surface of the panel support member 700 may be a front surface, and the opposite surface of the panel support member 700 may be a rear surface.

To attach the under-panel member 600 and the panel support member 700 to each other, a separate adhesive member may be disposed between the under-panel member 600 and the panel support member 700. In this case, the separate adhesive member may be a pressure sensitive adhesive.

A first digitizer member 910 and a second digitizer member 920 of the digitizer member 900 may be attached to the rear surface of the panel support member 700 by a second adhesive member 800. The second adhesive member 800 may be a pressure sensitive adhesive.

The first digitizer member 910 and the second digitizer member 920 may not be disposed in the folding area FDA to reduce folding stress of the display device 10. The first digitizer member 910 may be disposed in a first non-folding area NFA1, and the second digitizer member 920 may be disposed in a second non-folding area NFA2.

In this case, a first metal support member 1010 of a metal support member 1000 may be disposed on a rear surface of the first digitizer member 910, and a second metal support member 1020 may be disposed on a rear surface of the second digitizer member 920. In addition, a first buffer member 1110 of a buffer member 1100 may be disposed on a rear surface of the first metal support member 1010, and a second buffer member 1120 may be disposed on a rear surface of the second metal support member 1020. Further, a third adhesive member 1200 may be disposed on the rear surface of the first metal support member 1010 and the rear surface of the second metal support member 1020. That is, the third adhesive member 1200 may be disposed on edges of the first metal support member 1010 and edges of the second metal support member 1020 and may surround the first buffer member 1110 and the second buffer member 1120. The third adhesive member 1200 may be a waterproof tape or a waterproof member for attaching the rear surface of the first metal support member 1010 to a front surface of a frame disposed on a rear surface of the buffer member 1100.

Further, a window member 200 is attached to a front surface of the display panel 400 (operation S5400 of FIG. 11).

The window member 200 may be attached onto the front surface of the display panel 400 by a first adhesive member 300. The first adhesive member 300 may be a transparent adhesive film or a transparent adhesive resin. In this case, an upper protection member 100 may be disposed on a front surface of the window member 200.

Further, the under-panel member 600 is attached to a rear surface of the display panel 400 (operation S5500 of FIG. 11).

A panel protection member 500 may be disposed on the rear surface of the display panel 400. The under-panel member 600 may be attached to the rear surface of the display panel 400 by the panel protection member 500.

In an embodiment of a display device and a method of manufacturing the same according to the invention, a panel support member is included. The panel support member is disposed on a rear surface of a display panel and is a rigid member that is not easily changed in shape or volume by external pressure. Since the panel support member includes a polymer including carbon fibers or glass fibers, a magnetic field or electromagnetic signal of a digitizer member may pass through the panel support member. Therefore, the panel support member may stably support the display panel while not reducing the touch sensitivity of the digitizer member.

In an embodiment of a display device and a method of manufacturing the same according to the invention, energy of a laser applied to a panel support member may be reduced by adjusting a pulse period of the laser, a scan speed of the laser, a pulse repetition rate of the laser, and power of the laser. Therefore, since thermal energy generated on a cut surface of the panel support member may be reduced, it is possible to prevent a resin holding fiber yarn from falling off or cracking due to the thermal energy. Accordingly, it is possible to prevent a cut part of the fiber yarn from remaining as a byproduct on the cut surface of the panel support member.

In an embodiment of a display device and a method of manufacturing the same according to the invention, when a lattice pattern is formed or provided in a folding area of a panel support member, a forming order of slits may be determined such that the slits neighboring each other in a first direction and a second direction are not successively defined. Therefore, an area in which thermal energy due to a laser is accumulated may be removed from a plurality of bars that define the slits. Hence, it is possible to prevent a resin holding fiber yarn from falling off or from cracking due to the thermal energy. Accordingly, it is possible to prevent a cut part of the fiber yarn from remaining as a byproduct on a cut surface of the panel support member.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:
1. A foldable display device comprising:
   a display panel which comprises a folding area, a first non-folding area disposed adjacent to a first side of the folding area, and a second non-folding area disposed adjacent to a second side of the folding area opposite to the first side of the folding area; and
   a panel support member which is disposed on a surface of the display panel and in which a plurality of slits extending in a first direction perpendicular to a second direction in which the folding area, the first non-folding area and the second non-folding area are arranged is defined, the panel support member comprising:
      a first layer which has a plurality of first fiber yarns each of which extend only in the second direction;

a second layer which is directly disposed on the first layer and has a plurality of second fiber yarns extending only in the first direction in the folding area; and a third layer which is directly disposed on the second layer and has a plurality of third fiber yarns each of which extend only in the second direction, wherein the plurality of first fiber yarns is directly stacked in a third direction perpendicular to the first direction and the second direction, the plurality of second fiber yarns is directly stacked in the third direction, or the plurality of third fiber yarns is directly stacked in the third direction.

2. The foldable display device of claim 1, wherein a thickness of the second layer is greater than a thickness of the first layer and a thickness of the third layer.

3. The foldable display device of claim 1, wherein the first direction is parallel to a first folding line corresponding to a first boundary between the folding area and the first non-folding area and a second folding line corresponding to a second boundary between the folding area and the second non-folding area.

4. The foldable display device of claim 1, wherein the plurality of slits is defined in the folding area.

5. The foldable display device of claim 4, wherein the plurality of slits comprises first slits defined in a first column, second slits defined in a second column and third slits defined in a third column, and the second slits are shifted in the first direction compared with the first slits and the third slits.

6. The foldable display device of claim 5, wherein a lower half of any one of the first slits, an upper half of any one of the second slits, and a lower half of any one of the third slits overlap each other in the second direction.

* * * * *